US012641186B2

(12) United States Patent
Matsuyama et al.

(10) Patent No.: US 12,641,186 B2
(45) Date of Patent: May 26, 2026

(54) IMAGE READING APPARATUS, IMAGE READING SYSTEM, AND IMAGE READING CONTROL METHOD

(71) Applicant: SEIKO EPSON CORPORATION, Tokyo (JP)

(72) Inventors: Etsuya Matsuyama, Kitakyushu (JP); Hiroki Matsuda, Kitakyushu (JP); Yuji Takase, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 308 days.

(21) Appl. No.: 18/438,251

(22) Filed: Feb. 9, 2024

(65) Prior Publication Data

US 2024/0275901 A1       Aug. 15, 2024

(30) Foreign Application Priority Data

Feb. 10, 2023     (JP) ................................. 2023019042

(51) Int. Cl.
H04N 1/00          (2006.01)
H04N 1/327        (2006.01)

(52) U.S. Cl.
CPC ..... H04N 1/32765 (2013.01); H04N 1/00474 (2013.01); H04N 1/00824 (2013.01); H04N 1/32786 (2013.01)

(58) Field of Classification Search
None
See application file for complete search history.

(56) References Cited

U.S. PATENT DOCUMENTS

| | | | | |
|---|---|---|---|---|
| 11,677,887 | B2 * | 6/2023 | Takarabe | ........... H04N 1/00933 |
| | | | | 358/1.15 |
| 2003/0189719 | A1 * | 10/2003 | Saito | .................. H04N 1/32512 |
| | | | | 358/1.14 |
| 2005/0275887 | A1 * | 12/2005 | Yamanaka | ......... H04N 1/00408 |
| | | | | 358/1.15 |

(Continued)

FOREIGN PATENT DOCUMENTS

JP          2004-334449 A     11/2004

*Primary Examiner* — Pawan Dhingra
(74) *Attorney, Agent, or Firm* — WORKMAN NYDEGGER

(57) ABSTRACT

A controller is configured to control an image reading apparatus to a first connected state in which the image reading apparatus is connected to an external apparatus by a first connection method by which the image reading apparatus is connected to the external apparatus in a one-to-one relationship via a single communication path, and to a second connected state in which the image reading apparatus is connected to the external apparatus by a second connection method by which the image reading apparatus is connectable to a plurality of external apparatuses in a one-to-many relationship via a single communication path. The controller disables disconnection processing of disconnecting the image reading apparatus from the external apparatus to be performed when a first time period elapses without the image reading apparatus being operated in the first connected state, and enables the disconnection processing to be performed when the first time period elapses without the image reading apparatus being operated in the second connected state.

15 Claims, 12 Drawing Sheets

(56)             References Cited

U.S. PATENT DOCUMENTS

| | | | |
|---|---|---|---|
| 2011/0013232 A1* | 1/2011 | Ashikaga | H04N 1/00063 |
| | | | 358/452 |
| 2011/0267642 A1* | 11/2011 | Salgado | G06F 3/1204 |
| | | | 358/1.15 |
| 2013/0003133 A1* | 1/2013 | Yamamoto | H04N 1/0096 |
| | | | 358/448 |
| 2015/0036182 A1* | 2/2015 | Nakamura | G06F 3/1288 |
| | | | 358/1.15 |
| 2015/0268903 A1* | 9/2015 | Baba | H04W 76/30 |
| | | | 358/1.15 |
| 2016/0085489 A1* | 3/2016 | Hansen | G06F 3/1285 |
| | | | 358/1.15 |
| 2020/0004484 A1* | 1/2020 | Conway | G06F 3/126 |
| 2023/0188660 A1* | 6/2023 | Ehara | H04N 1/00464 |
| | | | 358/1.14 |

* cited by examiner

CONNECTED STATE SCREEN ~32,13

SECOND CONNECTED STATE ~48

EXTERNAL APPARATUS CAN BE USED FROM DRIVER CONNECTED TO NETWORK.

~49

START

TIME SETTING CONTROL PROCESS

~S10

WAS TIME SETTING INSTRUCTION ISSUED? — NO

YES ~S11

TIME SETTING PROCESSING

END

FIG. 7

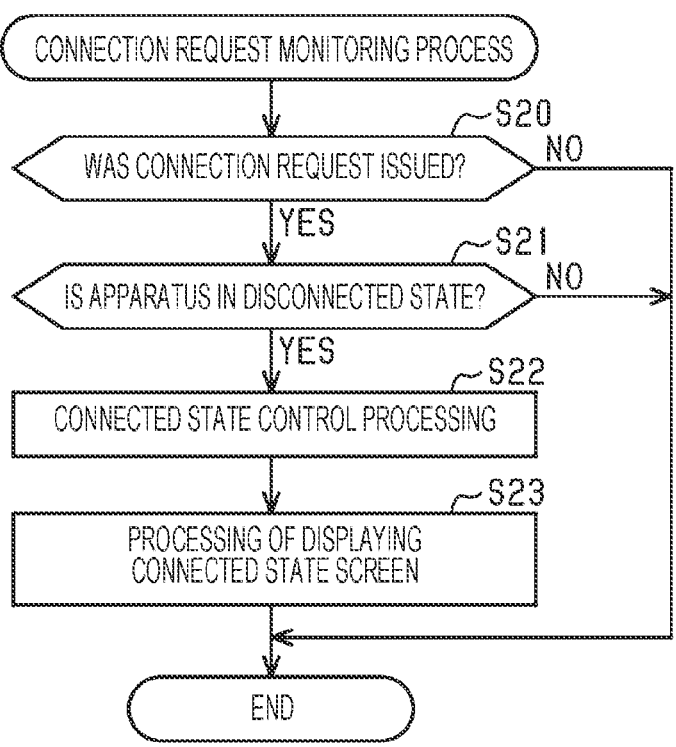

CONNECTION REQUEST MONITORING PROCESS

~S20
WAS CONNECTION REQUEST ISSUED? — NO

YES

~S21
IS APPARATUS IN DISCONNECTED STATE? — NO

YES

~S22
CONNECTED STATE CONTROL PROCESSING

~S23
PROCESSING OF DISPLAYING
CONNECTED STATE SCREEN

END

FIG. 8

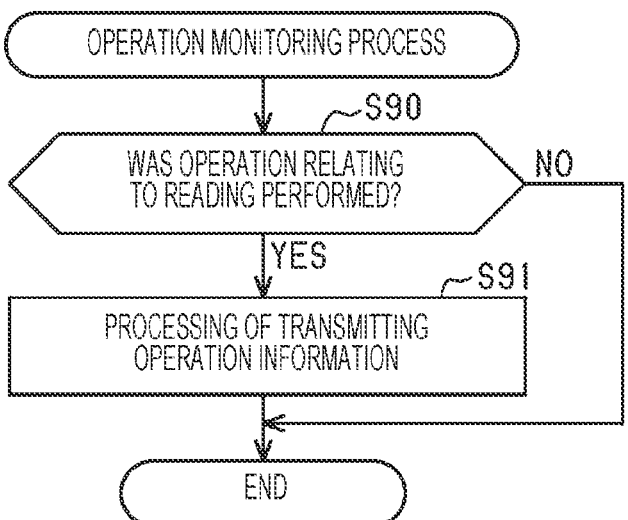

OPERATION MONITORING PROCESS

~S90
WAS OPERATION RELATING
TO READING PERFORMED? — NO

YES

~S91
PROCESSING OF TRANSMITTING
OPERATION INFORMATION

END

-SECOND CONNECTED STATE (t1 > t2 > t3)

-FIRST CONNECTED STATE (t3 > t2 > t1)

-FIRST CONNECTED STATE (t1 > t2 > t3)

-DISCONNECTED STATE (t3 > t2 > t1)

-DISCONNECTED STATE (t1 > t2 > t3)

IMAGE READING APPARATUS, IMAGE READING SYSTEM, AND IMAGE READING CONTROL METHOD

The present application is based on, and claims priority from JP Application Serial Number 2023-019042, filed Feb. 10, 2023, the disclosure of which is hereby incorporated by reference herein in its entirety.

BACKGROUND

1. Technical Field

The present disclosure relates to an image reading apparatus, an image reading system, and an image reading control method.

2. Related Art

For example, as described in JP-A-2004-334449, as an image reading apparatus that reads an image from an original, an apparatus is disclosed, which uses not only a first connection method by which the apparatus is connected to an external apparatus in a one-to-one relationship via a single communication path, but also a second connection method by which the apparatus is connected to external apparatuses in a one-to-many relationship via a single communication path. With such a configuration, a single image reading apparatus can communicate with a plurality of external apparatuses.

However, when one of the plurality of external apparatuses is connected to the image reading apparatus for a long time period, the other external apparatuses may not be able to be connected to the image reading apparatus. This reduces user convenience.

SUMMARY

To solve the above-described problems, according to an aspect of the present disclosure, an image reading apparatus that is connectable to an external apparatus and reads an image from an original includes a controller and an operation section. The controller is configured to control the image reading apparatus to a first connected state in which the image reading apparatus is connected to the external apparatus by a first connection method by which the image reading apparatus is connected to the external apparatus in a one-to-one relationship via a single communication path, and to a second connected state in which the image reading apparatus is connected to the external apparatus by a second connection method by which the image reading apparatus is connectable to a plurality of external apparatuses in a one-to-many relationship via a single communication path. The controller disables disconnection processing of disconnecting the image reading apparatus from the external device to be performed when a first time period elapses without the operation section being operated in the first connected state, and enables the disconnection processing to be performed when the first time period elapses without the operation section being operated in the second connected state.

To solve the above-described problems, according to another aspect of the present disclosure, an image reading system including an image reading apparatus that is connectable to an external apparatus and reads an image from an original includes a controller. The controller is configured to control the image reading apparatus to a first connected state in which the image reading apparatus is connected to the external apparatus by a first connection method by which the image reading apparatus is connected to the external apparatus in a one-to-one relationship via a single communication path of the image reading apparatus, and to a second connected state in which the image reading apparatus is connected to the external apparatus by a second connection method by which the image reading apparatus is connectable to a plurality of external apparatuses in a one-to-many relationship via a single communication path of the image reading apparatus. The controller disables disconnection processing of disconnecting the image reading apparatus from the external apparatus to be performed when a first time period elapses without the image reading apparatus being operated in the first connected state, and enables the disconnection processing to be performed when the first time period elapses without the image reading apparatus being operated in the second connected state.

To solve the above-described problems, according to still another aspect of the present disclosure, an image reading control method for an image reading apparatus that is connectable to an external apparatus and reads an image from an original includes disabling disconnection processing of disconnecting the image reading apparatus from the external apparatus to be performed when a first time period elapses without the image reading apparatus being operated in a first connected state in which the image reading apparatus is connected to the external apparatus by a first connection method by which the image reading apparatus is connected to the external apparatus in a one-to-one relationship via a single communication path of the image reading apparatus, and enabling the disconnection processing to be performed when the first time period elapses without the image reading apparatus being operated in a second connected state in which the image reading apparatus is connected to the external apparatus by a second connection method by which the image reading apparatus is connectable to a plurality of external apparatuses in a one-to-many relationship via a single communication path of the image reading apparatus.

BRIEF DESCRIPTION OF THE DRAWINGS

FIG. 7 is a flowchart illustrating a connection request monitoring process.

FIG. 8 is a flowchart illustrating an operation monitoring process.

DESCRIPTION OF EMBODIMENTS

First Embodiment

An embodiment of an image reading apparatus, an image reading system, and an image reading control method is described below.

Configuration of Image Reading System 10

Figures 1, 2:
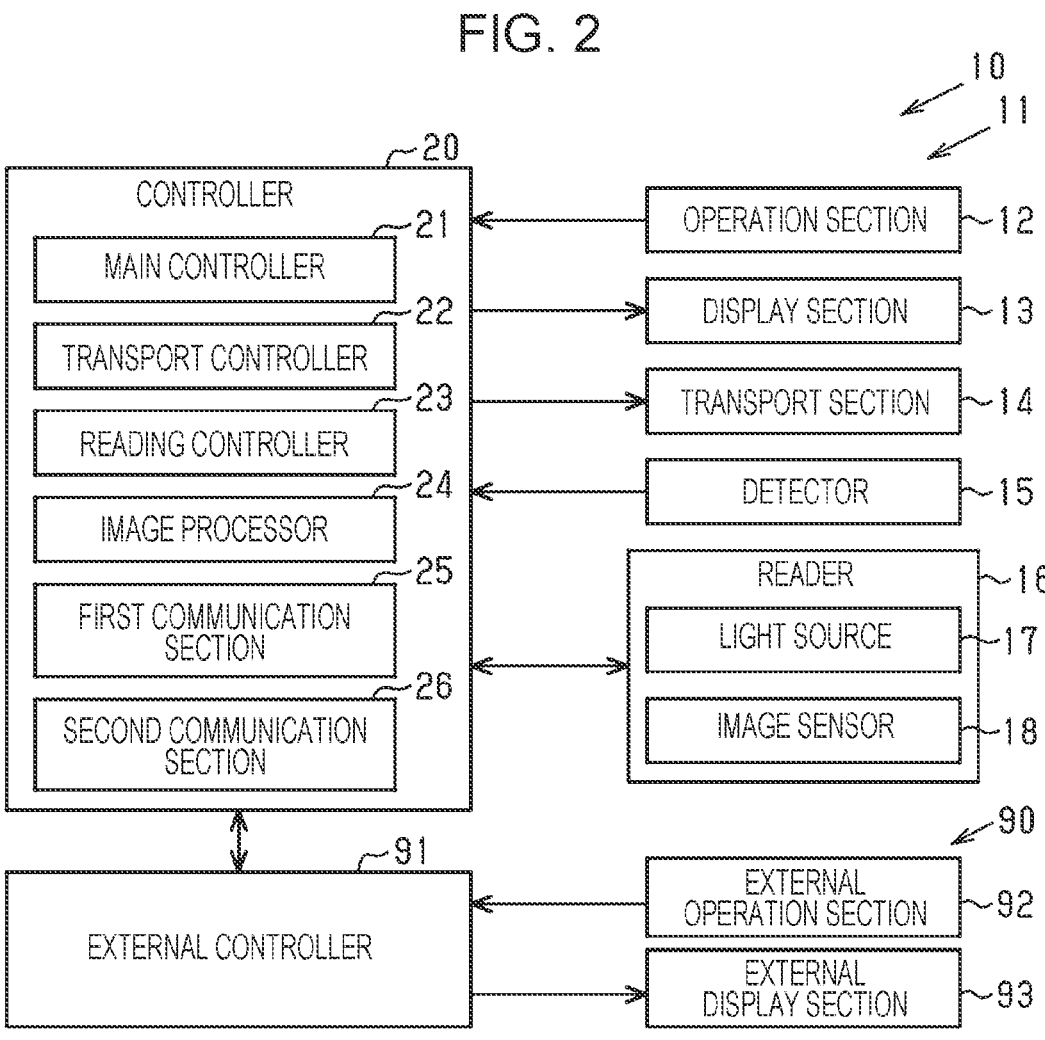
FIG. 1 is a schematic diagram illustrating an image reading system.
FIG. 2 is a block diagram illustrating an electrical configuration of the image reading system.

As illustrated in FIG. 1, an image reading system 10 is provided with an image reading apparatus 11. That is, the image reading system 10 includes the image reading apparatus 11. The image reading apparatus 11 is a scanner apparatus that reads an image from an original.

The image reading system 10 may include an external apparatus 90. The image reading system 10 may include a plurality of external apparatuses 90. Each of the external apparatuses 90 may be a terminal apparatus that is used by a user. Each of the external apparatuses 90 may be a personal computer, for example.

The image reading apparatus 11 is communicably connected to the external apparatus 90. That is, the image reading apparatus 11 is connectable to the external apparatus 90. Particularly, the image reading apparatus 11 may be communicably connected to the plurality of external apparatuses 90. In this case, the image reading apparatus 11 may permit the connection to one of the external apparatuses 90 and regulate the connection to the other external apparatuses 90.

As illustrated in FIG. 2, the image reading apparatus 11 includes an operation section 12. The operation section 12 is configured to be operable by a user. The image reading apparatus 11 may include a display section 13. The display section 13 is configured to display information. The operation section 12 and the display section 13 may be integrated like a touch panel, but may be separated from each other.

The image reading apparatus 11 may include a transport section 14. The transport section 14 is configured to transport the original along a transport path of the image reading apparatus 11. The transport path is a path extending through a reading region. The reading region is a region where the image is read from the original.

The transport section 14 may include rollers and a drive section that are not illustrated. The rollers transport the original along the transport path. The drive section is a drive source for rotating any one of the rollers. The drive section may be a motor.

The image reading apparatus 11 may include a detector 15. The detector 15 may include an encoder not illustrated. The encoder may be able to detect rotations of the rollers of the transport section 14. The encoder may output a detection signal indicating rotational amounts of the rollers.

The detector 15 may include an original sensor not illustrated. The original sensor is disposed along the transport path. The original sensor detects whether the original is present. The original sensor outputs a detection signal. The original sensor may be a contact sensor or may be a non-contact sensor.

The image reading apparatus 11 includes a reader 16. The image reading apparatus 11 may include a plurality of readers 16. The image reading apparatus 11 may include, as the plurality of readers 16, a first reader that reads an image from a front surface of an original, and a second reader that reads an image from a back surface of the original. The reader 16 is configured to read the image from the original transported by the transport section 14. The reader 16 is configured to read the image from the original in the reading region.

The reader 16 includes a light source 17. The light source 17 can irradiate the original being transported with light. The light source 17 may be an LED, a fluorescent lamp, or the like.

The reader 16 includes an image sensor 18. The image sensor 18 may be a linear image sensor or may be a contact image sensor, for example. The contact image sensor is an image sensor having a plurality of photoelectric conversion elements arrayed in a row along a width direction of the original. Specifically, the image sensor 18 may be a complementary metal oxide semiconductor (CMOS) image sensor.

The image sensor 18 receives light reflected from the original out of the light emitted from the light source 17. The image sensor 18 converts the light received by each of the photoelectric conversion elements into an electrical signal and outputs a pixel signal having a value corresponding to an amount of the received light. The image reading apparatus 11 can perform color scanning and monochrome scanning (grayscale scanning).

The image reading apparatus 11 includes a controller 20. The controller 20 comprehensively controls the image reading apparatus 11. The controller 20 may control various operations performed in the image reading apparatus 11. That is, the controller 20 performs control relating to image reading.

The controller 20 may include one or more processors that perform various types of processing in accordance with a program, one or more dedicated hardware circuits such as specific-application integrated circuits that perform at least a part of various types of processing, or a combination of the one or more processors and the one or more dedicated hardware circuits. The one or more processors include a CPU and a memory including a RAM and a ROM. The memory stores a program code or a command that is configured to cause the CPU to perform processing. The memory, that is, a computer-readable medium includes a readable medium that can be accessed by a general-purpose or dedicated computer.

The controller 20 is connected to the operation section 12, the display section 13, the transport section 14, the detector 15, and the reader 16. The controller 20 can receive signals from the operation section 12, the detector 15, and the reader 16. The controller 20 can output a signal to the display section 13, the transport section 14, and the reader 16.

The controller 20 includes functional sections that function in accordance with a program executed by the controller 20. Specifically, the controller 20 includes a main controller 21. The main controller 21 comprehensively controls the image reading apparatus 11.

The controller 20 includes a transport controller 22. The transport controller 22 controls the transport of the original along the transport path. The transport controller 22 drives and controls the drive section, which is a motor or the like, in accordance with an instruction from the main controller 21.

The controller 20 includes a reading controller 23. The reading controller 23 controls the reader 16. Specifically, the reading controller 23 controls light emission by the light source 17. The reading controller 23 controls the image sensor 18 to cause the image sensor 18 to perform a reading operation. Particularly, the reading controller 23 outputs a pulse signal indicating a reading operation timing to the reader 16 via a timing generator. Therefore, the reading controller 23 controls the reader 16 to cause the reader 16 to read the image of the original.

The controller 20 includes an image processor 24. The image processor 24 processes image data of the image read by the reader 16. Particularly, the image processor 24 converts the pixel signal from the image sensor 18 from an analog signal to a digital signal. Therefore, the image processor 24 acquires the image data and temporarily stores the image data. The image processor 24 may correct the image data based on a result of analyzing the image data. The image processor 24 outputs the corrected image data to the external apparatus 90.

The controller 20 includes a first communication section 25. The first communication section 25 performs control relating to communication with the external apparatus 90. The first communication section 25 can be connected to the external apparatus 90 by a first connection method. The first connection method is a connection method by which the image reading apparatus 11 is connected to the external apparatus 90 in a one-to-one relationship via a single communication path of the image reading apparatus 11. The first connection method is a connection method by which the image reading apparatus 11 can be physically connected to the external apparatus 90 in a one-to-one relationship via the single communication path. The single communication path corresponds to a single communication port, regardless of whether communication between the image reading apparatus 11 and the external apparatus 90 via the single communication path is serial communication or parallel communication and of whether the connection is wired connection or wireless connection. As a specific example, the first connection method may include communication between the image reading apparatus 11 and the external apparatus 90 in a state in which the image reading apparatus 11 and the external apparatus 90 can be connected to each other via a USB cable. That is, the first connection method may include a USB connection method.

The controller 20 includes a second communication section 26. The second communication section 26 performs control relating to communication with the external apparatus 90. The second communication section 26 can be connected to the external apparatus 90 by a second connection method. The second connection method is a connection method by which the image reading apparatus 11 is connectable to external apparatuses 90 in a one-to-many relationship via a single communication path of the image reading apparatus 11. The second connection method is a connection method by which the image reading apparatus 11 is physically connectable to external apparatuses 90 in a one-to-many relationship via the single communication path. As a specific example, the second connection method may include communication between the image reading apparatus 11 and the external apparatus 90 in a state in which the image reading apparatus 11 and each of external apparatuses 90 can be connected to each other via a LAN cable. That is, the second connection method may include a LAN connection method. The second connection method does not include, for example, a first connection method using a plurality of communication paths, such as a USB connection method using a plurality of communication paths.

A state in which the image reading apparatus 11 is not communicably connected to the external apparatus 90 is hereinafter referred to as a disconnected state. A state in which the image reading apparatus 11 is communicably connected to the external apparatus 90 is hereinafter referred to as a connected state. A state in which the image reading apparatus 11 is communicably connected to the external apparatus 90 by the first connection method is hereinafter referred to as a first connected state. A state in which the image reading apparatus 11 is communicably connected to the external apparatus 90 by the second connection method is hereinafter referred to as a second connected state.

The external apparatus 90 includes an external controller 91. The external controller 91 comprehensively controls the external apparatus 90. The external controller 91 may control various operations performed in the external apparatus 90. The external apparatus 90 is communicably connected to the image reading apparatus 11 that performs control relating to image reading. That is, it can be said that the external controller 91 performs control relating to image reading.

The external controller 91 may include one or more processors that perform various types of processing in accordance with a program. The one or more processors include a CPU and a memory including a RAM and a ROM. The memory stores a program code or a command that is configured to cause the CPU to perform the processing. The memory, that is, a computer-readable medium includes a readable medium that can be accessed by a general-purpose or dedicated computer.

The external controller 91 may include a reading driver. The reading driver may be usable when image reading software is installed in the external apparatus 90, or may be usable regardless of the image reading software. The reading driver may be included in the image reading software, but may not be included in the image reading software. The reading driver may be a driver having a function of instructing the image reading apparatus 11 to perform reading. The reading driver may be a driver having a function of receiving image data from the image reading apparatus 11.

The external apparatus 90 includes an external operation section 92 and an external display section 93. The external operation section 92 is operable by a user. That is, the external operation section 92 can receive an instruction provided by the user. The external display section 93 is configured to display an image.

In the external apparatus 90, when the external controller 91 starts the image reading software, the external controller 91 may cause the external display section 93 to display an operation screen not illustrated. The operation screen is a screen for operating the image reading software according to an operation of the external operation section 92 and for communicating with the image reading apparatus 11 via the reading driver according to an operation of the external operation section 92.

The external apparatus 90 can be communicably connected to the image reading apparatus 11 according to an operation of the external operation section 92. That is, the external apparatus 90 becomes connected to the image reading apparatus 11 according to an operation of the external operation section 92. In addition, the external apparatus 90 may be connected to the image reading apparatus 11 specified on the operation screen according to an operation of the external operation section 92. The external apparatus 90 may be connected to the image reading apparatus 11 set in advance according to an operation of the external operation section 92. As described above, the external apparatus 90 becomes connected to the image reading apparatus 11 via the reading driver.

The external apparatus 90 can be disconnected from the image reading apparatus 11 according to an operation of the external operation section 92. That is, the external apparatus 90 becomes disconnected from the image reading apparatus 11 according to an operation of the external operation section 92. Particularly, when an operation of the reading driver is ended according to an operation of the external operation section 92, the external apparatus 90 may become disconnected from the image reading apparatus 11. In addition, when a predetermined time period elapses without the external operation section 92 being operated, the external apparatus 90 may become disconnected from the image reading apparatus 11. As described above, the external apparatus 90 becomes disconnected from the image reading apparatus 11 via the reading driver.

Display Screens of Display Section 13

Display screens of the display section 13 are described below with reference to FIGS. 3 to 5.

Figure 3:
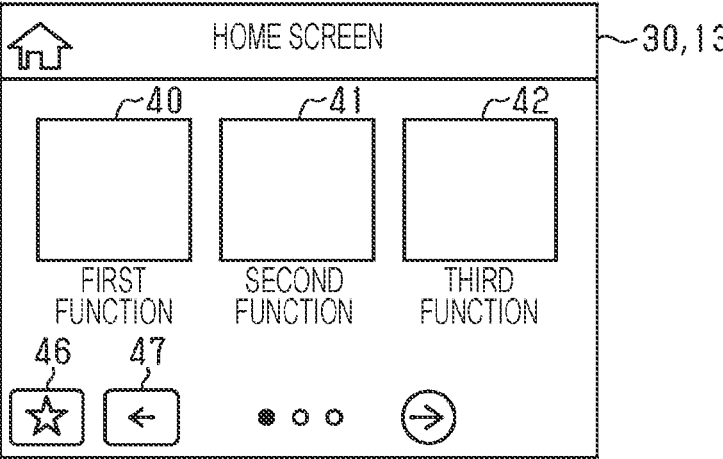
FIG. 3 is a schematic diagram illustrating a display screen in a display section.

As illustrated in FIG. 3, the display section 13 can display a home screen 30. The controller 20 can cause the display section 13 to display the home screen 30. The home screen 30 corresponds to an initial screen when the image reading apparatus 11 is used. The home screen 30 can transition to a function screen 31 according to an operation of the operation section 12. The function screen 31 is described below. That is, the home screen 30 is a screen on which a function is specifiable.

As a specific example, a functional button image may be displayed on the home screen 30. A plurality of functional button images may be displayed on the home screen 30. A first functional button image 40 may be displayed on the home screen 30. The first functional button image 40 is an image for performing control corresponding to a first function in response to detection of an operation. A second functional button image 41 may be displayed on the home screen 30. The second functional button image 41 is an image for performing control corresponding to a second function in response to detection of an operation. A third functional button image 42 may be displayed on the home screen 30. The third functional button image 42 is an image for performing control corresponding to a third function in response to detection of an operation.

A favorite button image 46 may be displayed on the home screen 30. The favorite button image 46 is an image for performing control corresponding to a favorite function in response to detection of an operation. The favorite function may be a function that can be registered by the user. A back button image 47 may be displayed on the home screen 30. The back button image 47 may be an image for returning back to a screen before an idle timeout in response to detection of an operation. The idle timeout is described below.

Figure 4:
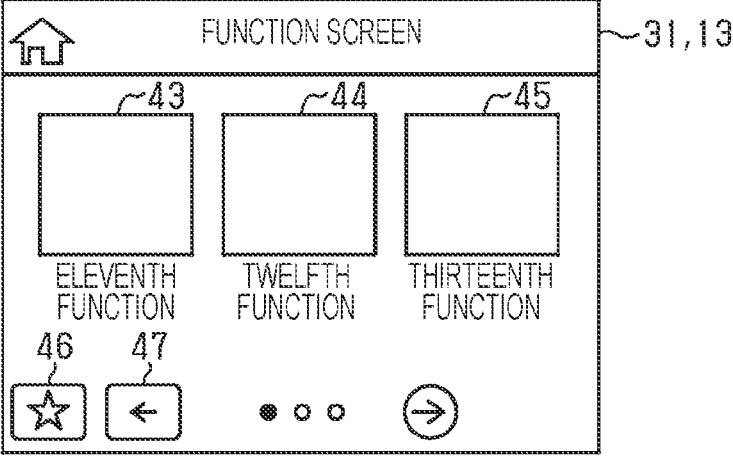
FIG. 4 is a schematic diagram illustrating a display screen in the display section.

As illustrated in FIG. 4, the display section 13 can display the function screen 31. The controller 20 can cause the display section 13 to display the function screen 31. The function screen 31 is a screen to which the home screen 30 can transition. That is, the function screen 31 can be displayed according to specifying from the home screen 30.

As a specific example, a functional button image may be displayed on the function screen 31. A plurality of functional button images may be displayed on the function screen 31. An eleventh functional button image 43 may be displayed on the function screen 31. The eleventh functional button image 43 is an image for performing control corresponding to an eleventh function in response to detection of an operation. A twelfth functional button image 44 may be displayed on the function screen 31. The twelfth functional button image 44 is an image for performing control corresponding to a twelfth function in response to detection of an operation. A thirteenth functional button image 45 may be displayed on the function screen 31. The thirteenth functional button image 45 is an image for performing control corresponding to a thirteenth function in response to detection of an operation.

For example, the function screen 31 may be a screen relating to a function of transferring image data to the external apparatus 90. For example, the function screen 31 may be a screen relating to a function of transferring image data to a mail address. For example, the function screen 31 may be a screen relating to a function of transferring image data to a cloud. The function screen 31 may include an image for specifying a transfer destination. The function screen 31 may include an image for registering a transfer destination. The function screen 31 may include an image for displaying manual information.

Figure 5:
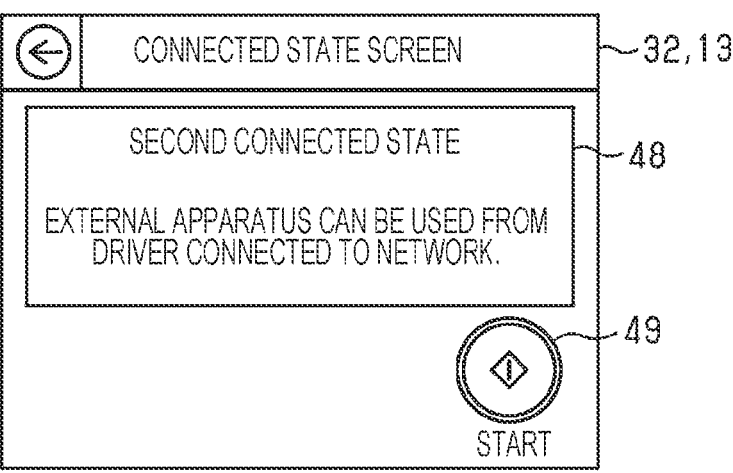
FIG. 5 is a schematic diagram illustrating a display screen in the display section.

As illustrated in FIG. 5, the display section 13 can display a connected state screen 32. The controller 20 can cause the display section 13 to display the connected state screen 32. The connected state screen 32 is a screen that is displayed when the image reading apparatus 11 is in the connected state. That is, the connected state screen 32 is a screen indicating that the image reading apparatus 11 is in the connected state.

As a specific example, a connected state image 48 can be displayed on the connected state screen 32. The connected state image 48 may include an image indicating the connected state. The connected state image 48 may include an image that can identify whether the connected state is the first connected state or the second connected state. A start reading button image 49 can be displayed on the function screen 31. The start reading button image 49 is an image for starting reading the image from the original in response to detection of an operation.

Details of Control by Controller 20

Next, details of control by the controller 20 are described below.

The controller 20 can perform idle timeout control as a detail of control relating to the image reading apparatus 11. The idle timeout control is performed when an idle timeout occurs. In a state in which a screen different from the home screen 30 is displayed by the display section 30, the idle timeout control is performed to cause the display section 13 to display the home screen 30.

A condition for the occurrence of the idle timeout can be established when a first time period elapses without the operation section 12 being operated. The first time period corresponds to an upper limit of a time period for performing the idle timeout control.

The condition for the occurrence of the idle timeout may be established when a second time period elapses without operation information being received by the image reading apparatus 11 from the external apparatus 90. The operation information can identify an operation relating to image reading in the external apparatus 90. The second time period corresponds to an upper limit of a time period for performing the idle timeout control.

The controller 20 may control a power saving mode as a detail of control relating to the image reading apparatus 11. The power saving mode is a mode for saving power consumption of the image reading apparatus 11. In the power saving mode, the display section 13 displays a power saving screen. As a specific example, in the power saving mode, the display section 13 displays a screen while a backlight of the display section 13 may be turned off. A condition for the control of the power saving mode may be established when a third time period elapses without the operation section 12 being operated. The condition for the control of the power saving mode may be established when the third time period elapses without operation information being received by the image reading apparatus 11 from the external apparatus 90. The third time period corresponds to an upper limit of a time period for the control to the power saving mode.

Time Setting Control Process

A time setting control process is described with reference to FIG. 6. The time setting control process is performed by the controller 20 at a predetermined time interval.

Figure 6:
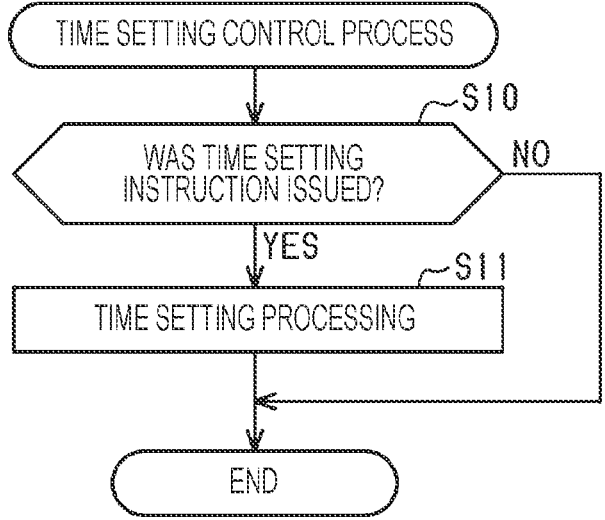
FIG. 6 is a flowchart illustrating a time setting control process.

As illustrated in FIG. 6, in step S10, the controller 20 determines whether a time setting instruction was issued. In this processing in step S10, the controller 20 may determine, according to an operation of the operation section 12, whether the time setting instruction was issued. The controller 20 may determine, according to information from the external apparatus 90, whether the time setting instruction was issued.

The time setting instruction is an instruction to set a time period for controlling the image reading apparatus 11. The time period for controlling the image reading apparatus 11 may include at least any one of the first and second time periods for performing the idle timeout control and the third time period for the control to the power saving mode.

When the controller 20 determines that the time setting instruction was not issued, the controller 20 ends the time setting control process without performing step S11. When the controller 20 determines that the time setting instruction was issued, the controller 20 advances the process to step S11.

In step S11, the controller 20 performs time setting processing. In this processing in step S11, the controller 20 sets the time period corresponding to the time setting instruction in the memory of the controller 20. As described above, the controller 20 can change a setting of at least any one of the first time period, the second time period, and the third time period. When the time setting processing ends, the controller 20 ends the time setting control process.

Connection Request Monitoring Process

Next, a connection request monitoring process is described with reference to FIG. 7. The connection request monitoring process is performed by the controller 20 at a predetermined time interval.

As illustrated in FIG. 7, in step S20, the controller 20 determines whether a connection request was issued from the external apparatus 90. The connection request is a request that is transmitted from the external apparatus 90 via the reading driver according to an operation of the external operation section 92. When the controller 20 determines that the connection request was not issued from the external apparatus 90, the controller 20 ends the connection request monitoring process without performing steps S21 to S23. When the controller 20 determines that the connection request was issued from the external apparatus 90, the controller 20 advances the process to step S21.

In step S21, the controller 20 determines whether the image reading apparatus 11 is in the disconnected state. When the controller 20 determines that the image reading apparatus 11 is not in the disconnected state, the controller 20 ends the connection request monitoring process without performing steps S22 and S23. When the controller 20 determines that the image reading apparatus 11 is in the disconnected state, the controller 20 advances the process to step S22.

In step S22, the controller 20 performs connected state control processing. In this processing in step S22, the controller 20 permits the connection request from the external apparatus 90. The controller 20 identifies the first or second connection method by which the image reading apparatus 11 will be connected to the external apparatus 90 for which the connection request was permitted. The controller 20 controls the image reading apparatus 11 to the connected state corresponding to the identified connection method. Specifically, when the identified connection method is the first connection method, the controller 20 controls the image reading apparatus 11 to the first connected state. When the identified connection method is the second connection method, the controller 20 controls the image reading apparatus 11 to the second connected state. The controller 20 stores the controlled connected state in the memory of the controller 20. When the connected state control processing ends, the controller 20 advances the process to step S23.

In step S23, the controller 20 performs processing of displaying the connected state. In this processing in step S23, the controller 20 controls the display section 13 to cause the display section 13 to display the connected state screen 32. When the processing of displaying the connected state screen ends, the controller 20 ends the connection request monitoring process.

Operation Monitoring Process

Next, an operation monitoring process is described with reference to FIG. 8. The operation monitoring process is performed by the external controller 91 at a predetermined time interval in a state in which the image reading software is executed in the external apparatus 90 and the external apparatus 90 is connected to the image reading apparatus 11 via the reading driver.

As illustrated in FIG. 8, in step S90, the external controller 91 determines, based on a signal from the external operation section 92, whether an operation relating to reading was performed. The operation relating to reading may include an operation of the external operation section 92 on the image reading software being executed. That is, the operation relating to reading may include an operation relating to image reading in the external apparatus 90.

When the external controller 91 determines that the operation relating to reading was not performed, the external controller 91 ends the operation monitoring process without performing step S91. When the external controller 91 determines that the operation relating to reading was performed, the external controller 91 advances the process to step S91.

In step S91, the external controller 91 performs processing of transmitting operation information. In this processing in step S91, the external controller 91 transmits the operation information to the image reading apparatus 11. Therefore, when the operation relating to reading is being performed, the external controller 91 transmits the operation information to the image reading apparatus 11 at a predetermined time interval. The external controller 91 transmits the operation information to the image reading apparatus 11 regardless of whether the external apparatus 90 is connected to the image reading apparatus 11 by the first connection method or by the second connection method. In the first connected state and the second connected state, when an operation relating to image reading is performed in the external apparatus 90, the external controller 91 transmits operation information that can identify the operation relating to image reading to the image reading apparatus 11 at a predetermined time interval.

Process of Controlling Monitoring Timer

Next, a process of controlling a monitoring timer is described with reference to FIG. 9. The process of controlling the monitoring timer is performed by the controller 20 at a predetermined time interval.

Figure 9:
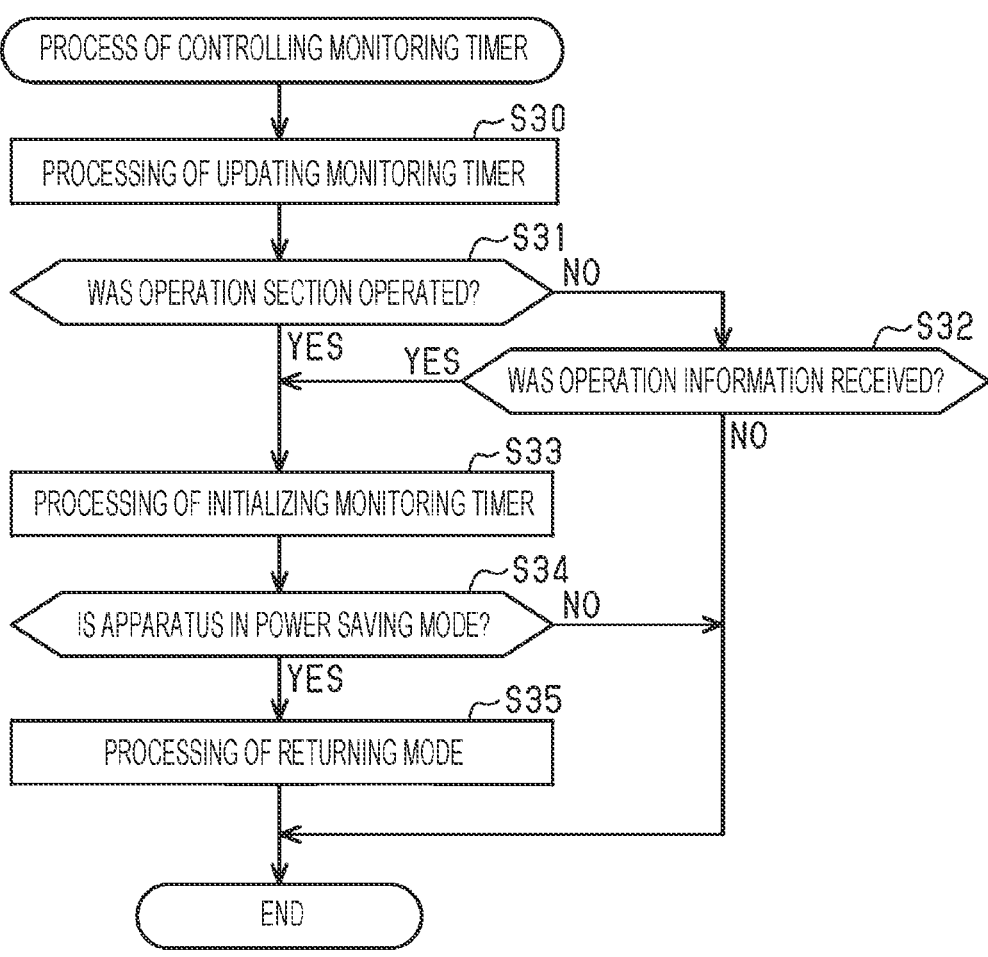
FIG. 9 is a flowchart illustrating a process of controlling a monitoring timer.

As illustrated in FIG. 9, in step S30, the controller 20 performs processing of updating the monitoring timer. In this processing in step S30, the controller 20 updates the monitoring timer assigned to the memory of the controller 20. The monitoring timer is a timer for determining whether the first time period, the second time period, and the third time period elapsed. The monitoring timer counts the first time period, the second time period, and the third time period. When the processing of updating the monitoring timer ends, the controller 20 advances the process to step S31.

In step S31, the controller 20 determines, based on a signal from the operation section 12, whether the operation section 12 was operated. That is, the controller 20 determines whether the image reading apparatus 11 was operated. When either a valid region in which an operation of the operation section 12 is determined to be valid or an invalid region in which an operation of the operation section 12 is not determined to be valid is operated, the controller 12 may determine that the operation section 12 was operated. As a specific example, the valid region includes various button images, and the invalid region does not include the various button images and includes a region in which the various button images are not displayed. When any portion of the entire region of the operation section 12 is operated, the controller 20 may determine that the operation section 12 was operated. When the valid region is operated, the controller 20 may determine that the operation section 12 was operated. When the invalid region is operated, the controller 20 may determine that the operation section 12 was not operated. When the controller 20 determines that the operation section 12 was not operated, the controller 20 advances the process to step S32. When the controller 20 determines that the operation section 12 was operated, the controller 20 advances the process to step S33.

In step S32, the controller 20 determines whether the controller 20 received the operation information from the external apparatus 90 in the connected state. That is, the controller 20 determines whether the external apparatus 90 was operated. When the controller 20 determines that the controller 20 did not received the operation information, the controller 20 ends the process of controlling the monitoring timer without performing steps S33 to S35. When the controller 20 determines that the controller 20 received the operation information, the controller 20 advances the process to step S33.

In step S33, the controller 20 performs processing of initializing the monitoring timer. In this processing in step S33, the controller 20 initializes the monitoring timer. When the operation section 12 is operated, the controller 20 initializes the monitoring timer for determining whether the first time period, the second time period, and the third time period elapsed. When the processing of initializing the monitoring timer ends, the controller 20 advances the process to step S34.

In step S34, the controller 20 determines whether controller 20 is controlling the image reading apparatus 11 to the power saving mode. When the controller 20 determines that the controller 20 is controlling the image reading apparatus 11 to the power saving mode, the controller 20 ends the process of controlling the monitoring timer without performing step S35. When the controller 20 determines that the controller 20 is controlling the image reading apparatus 11 to the power saving mode, the controller 20 advances the process to step S35.

In step S35, the controller 20 performs processing of returning the mode. In this processing in step S35, the controller 20 ends the power saving mode. When the controller 20 is controlling the image reading apparatus 11 to the power saving mode, and an end condition is established, the controller 20 may end the power saving mode. The end condition may be established when an operation signal is input to the controller 20 from the operation section 12. The end condition may be established when the controller 20 receives the operation information from the external apparatus 90 in the connected state.

When the end condition is established, and the image reading apparatus 11 is in the connected state, the controller 20 causes the display section 13 to display the connected state screen 32. When the end condition is established, the image reading apparatus 11 is in the disconnected state, and an idle timeout does not occur in a state in which the image reading apparatus 11 is being controlled to the power saving mode, the controller 20 causes the display section 13 to display a display screen displayed immediately before the image reading apparatus 11 is controlled to the power saving mode. When the end condition is established, the image reading apparatus 11 is in the disconnected state, and an idle timeout occurs in a state in which the image reading apparatus 11 is being controlled to the power saving mode, the controller 20 causes the display section 13 to display the home screen 30. When the processing of returning the mode ends, the controller 20 ends the process of the controlling the monitoring timer.

State Monitoring Process

Next, a state monitoring process is described with reference to FIG. 10. The state monitoring process is performed by the controller 20 at a predetermined time interval.

Figure 10:
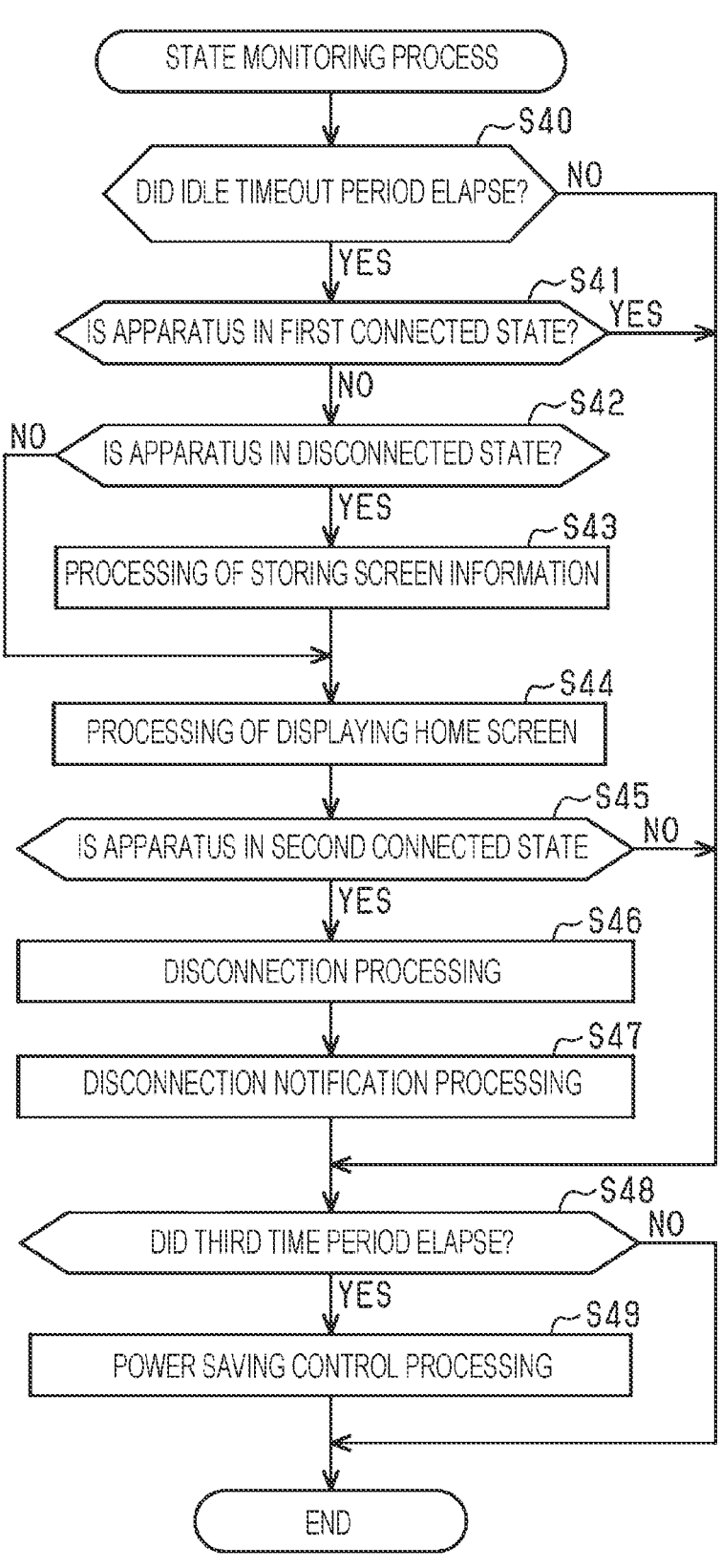
FIG. 10 is a flowchart illustrating a state monitoring process.

As illustrated in FIG. 10, in step S40, the controller 20 determines whether an idle timeout period elapsed. In this processing in step S40, when the controller 20 determines, based on the monitoring timer, that the first time period or the second time period elapsed, the controller 20 determines that the idle timeout period elapsed. That is, when the first time period is equal to or shorter than the second time period, and the controller 20 determines, based on the monitoring timer, that the first time period elapsed, the controller 20 determines that the idle timeout period elapsed. When the second time period is equal to or shorter than the first time period, and the controller 20 determines, based on the monitoring timer, that the second time period elapsed, the controller 20 determines that the idle timeout period elapsed. When the controller 20 determines that the idle timeout period did not elapse, the controller 20 advances the process to step S48 without performing steps S41 to S47. When the controller 20 determines that the idle timeout period elapsed, the controller 20 advances the process to step S41.

In step S41, the controller 20 determines whether the image reading apparatus 11 is in the first connected state. When the controller 20 determines that the image reading apparatus 11 is in the first connected state, the controller 20 advances the process to step S48 without performing steps S42 to S47. When the controller 20 determines that the image reading apparatus 11 is in the second connected state or in the disconnected state, the controller 20 advances the process to step S42.

In step S42, the controller 20 determines whether the image reading apparatus 11 is in the disconnected state. When the controller 20 determines that the image reading apparatus 11 is not in the disconnected state, the controller 20 advances the process to step S44 without performing step S43. When the controller 20 determines that the image reading apparatus 11 is in the disconnected state, the controller 20 advances the process to step S43.

In step S43, the controller 20 performs processing of storing screen information. In this processing in step S43, the controller 20 stores, in the memory of the controller 20, screen information when an idle timeout occurs. The screen information may include a display screen that was already displayed by the display section 13 when the idle timeout occurred. The screen information may include input information that was already input on the display screen when the idle timeout occurred. The screen information may include user identification information and a password that were already used for login when the idle timeout occurred.

When the first time period elapses without the operation section 12 being operated in a state in which the controller 20 causes the display section 13 to display a screen that is, for example, the function screen 31 or the like and is not the home screen 30, the controller 20 stores a detail displayed on the function screen 31. Particularly, the controller 20 stores a detail input on the function screen 31. When the processing of storing the screen information ends, the controller 20 advances the process to step S44.

In step S44, the controller 20 performs processing of displaying the home screen. In this processing in step S44, the controller 20 controls the display section 13 to cause the display section 13 to display the home screen 30. When the first time period elapses without the operation section 12 being operated in a state in which the controller 20 causes the display section 13 to display the connected state screen 32 in the second connected state, the controller 20 can cause the display section 30 to display the home screen 30. When the second time period elapses without an operation relating to image reading being performed in the external apparatus 90 in a state in which the controller 20 causes the display section 13 to display the connected state screen 32 in the second connected state, the controller 20 can cause the display section 13 to display the home screen 30. When the first time period elapses without the operation section 12 being operated in a state in which the controller 20 causes the display section 13 to display a screen that is, for example, the function screen 31 or the like and is not the home screen 30 in the disconnected state, the controller 20 can cause the display section 13 to display the home screen 30. Even when the first time period elapses without the operation section 12 being operated in a state in which the controller 20 causes the display section 13 to display the home screen 30 in the disconnected state, the controller 20 causes the display section 13 to continuously display the home screen 30. When the processing of displaying the home screen ends, the controller 20 advances the process to step S45.

In step S45, the controller 20 determines whether image reading apparatus 11 is in the second connected state. When the controller 20 determines that the image reading apparatus 11 is in the disconnected state, the controller 20 advances the process to step S48 without performing steps S46 and S47. When the controller 20 determines that the image reading apparatus 11 is in the second connected state, the controller 20 advances the process to step S46.

In step S46, the controller 20 performs disconnection processing. In this processing in step S46, the controller 20 disconnects the image reading apparatus 11 from the external apparatus 90. Specifically, the controller 20 releases the connection between the image reading apparatus 11 and the external apparatus via the reading driver. Therefore, the controller 20 controls the image reading apparatus 11 to the disconnected state. When the first time period is equal to or shorter than the second time period and elapses without the operation section 12 being operated in the second connected state, the controller 20 enables the disconnection processing to be performed. When the second time period is equal to or shorter than the first time period and elapses without an operation relating to image reading being performed in the external apparatus 90 in the second connected state, the controller 20 enables the disconnection processing to be performed.

Even when the first time period elapses without the operation section 12 being operated in the first connected state, the controller 20 disables the disconnection processing to be performed. Even when the second time period elapses without an operation relating to image reading being performed in the external apparatus 90 in the first connected state, the controller 20 disables the disconnection processing to be performed. When the disconnection processing ends, the controller 20 advances the process to step S47.

In step S47, the controller 20 performs disconnection notification processing. In this processing in step S47, the controller 20 transmits disconnection notification information to the external apparatus 90 disconnected. The disconnection notification information is information notifying that the image reading apparatus 11 was disconnected from the external apparatus 90. When the disconnection notification processing ends, the controller 20 advances the process to step S48.

In step S48, the controller 20 determines, based on the monitoring timer, whether the third time period elapsed. When the controller 20 determines that the third time period did not elapse, the controller 20 ends the state monitoring process without performing step S49. When the controller 20 determines that the third time period elapsed, the controller 20 advances the process to step S49.

In step S49, the controller 20 performs power saving control processing. In this processing in step S49, the controller 20 controls the image reading apparatus 11 to the power saving mode. The controller 20 causes the display section 13 to display the power saving screen. As a specific example, the controller 20 causes the display section 13 to display the screen while turning off the backlight of the display section 13. When the power saving control processing ends, the controller 20 ends the state monitoring process.

When the third time period elapses without the image reading apparatus 11 being operated, the controller 20 can control the image reading apparatus 11 to the power saving mode. Particularly, when the third time period is shorter than the first time period and elapses without the operation section 12 being operated in the second connected state, the controller 20 controls the image reading apparatus 11 to the power saving mode. When the third time period is shorter than the first time period and the first time period elapses without the image reading apparatus 11 being operated in the second connected state, the controller 20 performs the disconnection processing. When the third time period is shorter than the second time period and elapses without the operation section 12 being operated in the second connected state, the controller 20 controls the image reading apparatus 11 to the power saving mode. When the third time period is shorter than the second time period, and the second time period elapses without an operation relating to image reading being performed in the external apparatus 90 in the second connected state, the controller 20 performs the disconnection processing.

Connection Monitoring Process

Next, a connection monitoring process is described with reference to FIG. 11. The connection monitoring process is performed by the external controller 91 at a predetermined time interval.

Figure 11:
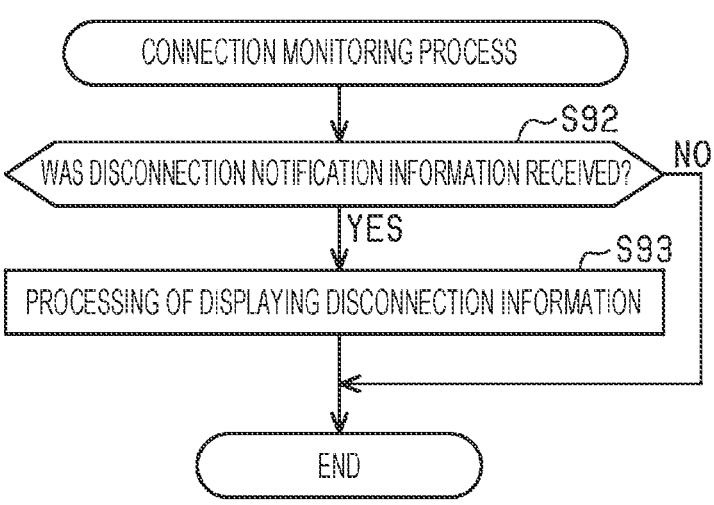
FIG. 11 is a flowchart illustrating a connection monitoring process.

As illustrated in FIG. 11, in step S92, the external controller 91 determines whether the external controller 91 received the disconnection notification information from the image reading apparatus 11. When the external controller 91 determines that the external controller 91 did not receive the disconnection notification information, the external controller 91 ends the connection monitoring process without performing step S93. When the external controller 91 determines that the external controller 91 received the disconnection notification information, the external controller 91 advances the process to step S93.

In step S93, the external controller 91 performs processing of displaying disconnection information. In this processing in step S93, the external controller 91 causes the external display section 93 to display the disconnection information that can identify that the external apparatus 90 was disconnected from the image reading apparatus 11.

In this manner, the controller 20 can cause the external display section 93 to display the disconnection information by transmitting the disconnection notification information to the external apparatus 90. Therefore, when the controller 20 performs the disconnection processing, the controller 20 can notify the external apparatus 90 that the image reading apparatus 11 was disconnected from the external apparatus 90. In addition, when the controller 20 performs the disconnection processing, the controller 20 may notify the external apparatus 90 that the image reading apparatus 11 was disconnected from the external apparatus 90 without notifying the image reading apparatus 11 that the image reading apparatus 11 was disconnected from the external apparatus 90. That is, the controller 20 may notify both of the image reading apparatus 11 and the external apparatus 90 that the image reading apparatus 11 was disconnected from the external apparatus 90. When the processing of displaying the disconnection information ends, the controller 20 ends the connection monitoring process.

Redisplay Control Process

Next, a redisplay control process is described with reference to FIG. 12. The redisplay control process is performed by the controller 20 at a predetermined time interval.

Figure 12:
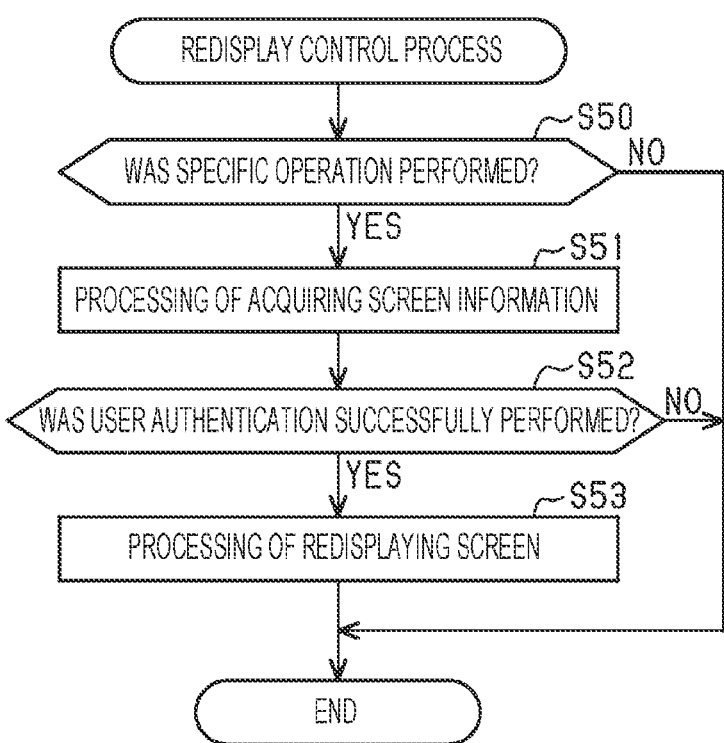
FIG. 12 is a flowchart illustrating a redisplay control process.

As illustrated in FIG. 12, in step S50, the controller 20 determines whether a specific operation was performed. The specific operation may include an operation that is performed on the back button image 47 on the home screen 30. The specific operation may be only an operation that is performed during the display of the home screen 30. The specific operation may include an operation that is performed on a return button image (not illustrated) after the favorite button image 46 is operated on the home screen 30. The return button image is an image registered as a favorite image. The specific operation may include both of an operation that is performed during the display of the home screen 30 and an operation that is performed during the display of a screen other than the home screen 30. That is, it is suffices for the specific operation to be performed after the home screen 30 is displayed by the display section 13.

When the controller 20 determines that the specific operation was not performed, the controller 20 ends the redisplay control process without performing steps S51 to S53. When the controller 20 determines that the specific operation was performed, the controller 20 advances the process to step S51.

In step S51, the controller 20 performs processing of acquiring screen information. In this processing in step S51, the controller 20 acquires the screen information stored in the memory of the controller 20. When the processing of acquiring the screen information ends, the controller 20 advances the process to step S52.

In step S52, the controller 20 determines whether user authentication was successfully performed. In this processing in step S52, the controller 20 causes the display section 13 to display a screen requesting user identification information and a password. When the user identification information and the password are input to the controller 20 according to an operation of the operation section 12, the controller 20 performs the user authentication based on the user identification information and the password.

Specifically, the controller 20 determines whether user identification information that was already used for login when an idle timeout occurred matches the input user identification information. The controller 20 determines whether a password corresponding to the user identification information that was already used for the login when the idle timeout occurred matches the input password. In this manner, the controller 20 determines whether the user authentication was successfully performed.

When the controller 20 determines that the user authentication was not successfully performed, the controller 20 ends the redisplay control process without performing step S53. When the controller 20 determines that the user authentication was successfully performed, the controller 20 advances the process to step S53.

In step S53, the controller 20 performs processing of redisplaying a screen. In this processing in step S53, the controller 20 causes the display section 13 to redisplay a display screen that was already displayed when the idle timeout occurred. The controller 20 causes, based on the acquired screen information, the display section 13 to redisplay input information that was already input on the display screen when the idle timeout occurred.

The controller 20 causes the display section 13 to redisplay the function screen 31 corresponding to the stored screen information according to the specific operation after the idle timeout occurs in a state in which the function screen 31 is displayed by the display section 13 and the home screen 30 is displayed by the display screen 13. Particularly, the controller 20 causes the display section 13 to redisplay the function screen 31 corresponding to a stored input detail according to the specific operation. When the processing of redisplaying the screen, the controller 20 ends the redisplay control process.

Operations in First Embodiment

Operations in the first embodiment are described below.

First, a first specific example of the operations in the first embodiment is described with reference to FIG. 13. As the first specific example, a case where the first time period is shorter than the second time period, the second time period is shorter than the third time period, and the image reading apparatus 11 is in the second connected state is described below. In each of FIGS. 13 to 19, the first time period is indicated by reference sign t1, the second time period is indicated by reference sign t2, and the third time period is indicated by reference sign t3.

Figure 13:
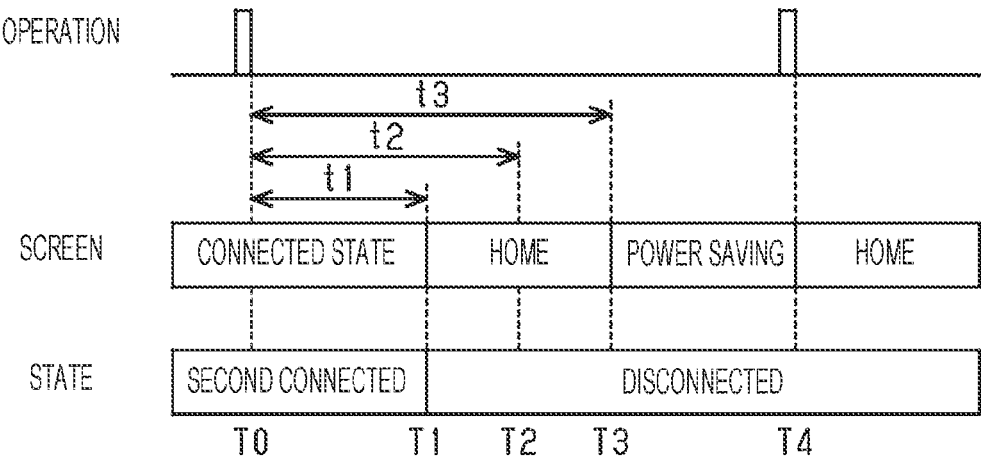
FIG. 13 is a timing chart illustrating details of control.

As illustrated in FIG. 13, at a timing indicated by reference sign T0, when the operation section 12 is operated or operation information is received by the image reading apparatus 11, the monitoring timer is initialized, and the display section 13 displays the connected state screen 32.

At a timing indicated by reference sign T1, when the first time period elapses from the timing indicated by reference sign T0 without the operation section 12 being operated or without operation information being received by the image reading apparatus 11, the controller 20 controls the image reading apparatus 11 to the disconnected state. At the timing indicated by reference sign T1, the display section 13 displays the home screen 30.

As described above, when the first time period elapses without the operation section 12 being operated in a state in which the connected state screen 32 is displayed by the display section 13 in the second connected state, the controller 20 controls the image reading apparatus 11 to the disconnected state and display section 13 displays the home screen 30.

At a timing indicated by reference sign T2, even when the second time period elapses from the timing indicated by reference sign T0 without the operation section 12 being operated or without operation information being received by the image reading apparatus 11, the image reading apparatus 11 is continuously in the disconnected state. At the timing indicated by reference sign T2, the display section 13 displays the home screen 30.

At a timing indicated by reference sign T3, when the third time period elapses from the timing indicated by reference sign T0 without the operation section 12 being operated or without operation information being received by the image reading apparatus 11, the controller 20 controls the image reading apparatus 11 to the power saving mode. At the timing indicated by reference sign T3, the image reading apparatus 11 is continuously in the disconnected state. At the timing indicated by reference sign T3, the display section 13 displays the power saving screen.

Thereafter, at a timing indicated by reference sign T4, when the end condition is established due to an operation of the operation section 12 or the reception of operation information by the image reading apparatus 11, the power saving mode ends. At the timing indicated by reference sign T4, the image reading apparatus 11 is continuously in the disconnected state. At the timing indicated by reference sign T4, the display section 13 displays the home screen 30.

Next, a second specific example of the operations in the first embodiment is described with reference to FIG. 14. As the second specific example, a case where the second time period is shorter than the first time period, the first time period is shorter than the third time period, and the image reading apparatus 11 is in the second connected state is described below. In the following specific examples, the same configurations as those described above in the embodiment are denoted by the same reference signs as those described above in the embodiment, and repetitive description of the configurations is omitted or simplified.

Figure 14:
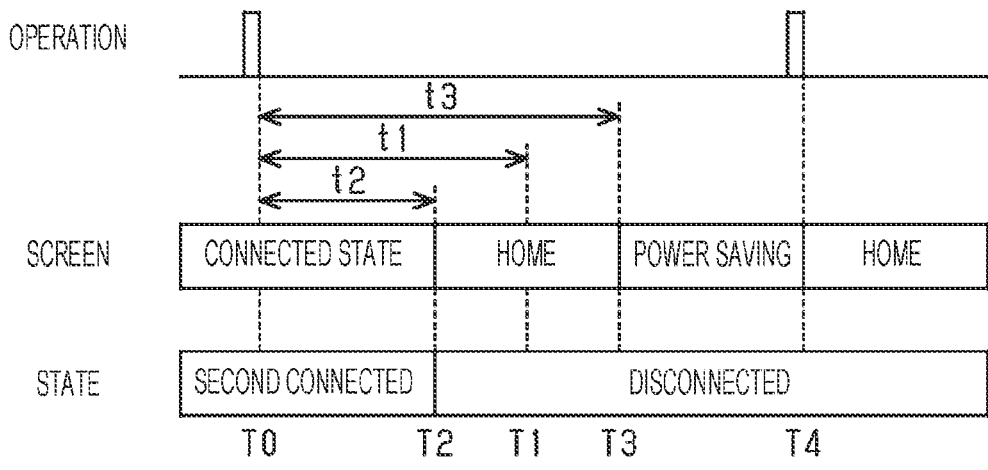
FIG. 14 is a timing chart illustrating details of control.

As illustrated in FIG. 14, at a timing indicated by reference sign T2, when the second time period elapses from a timing indicated by reference sign T0 without the operation section 12 being operated or without operation information being received by the image reading apparatus 11, the controller 20 controls the image reading apparatus 11 to the disconnected state. At the timing indicated by reference sign T2, the display section 13 displays the home screen 30.

As described above, when the second time period elapses without an operation relating to image reading being performed in the external apparatus 90 in a state in which the connected state screen 32 is displayed by the display section 13 in the second connected state, the controller 20 controls the image reading apparatus 11 to the disconnected state and the display section 13 displays the home screen 30.

At a timing indicated by reference sign T1, even when the first time period elapses after the timing indicated by reference sign T0 without the operation section 12 being operated or without operation information being received by the image reading apparatus 11, the image reading apparatus 11 is continuously in the disconnected state. At the timing indicated by reference sign T1, the display section 13 displays the home screen 30.

Next, a third specific example of the operations in the first embodiment is described with reference to FIG. 15. As the third specific example, a case where the third time period is shorter than the second time period, the second time period is shorter than the first time period, and the image reading apparatus 11 is in the second connected state is described below.

Figure 15:
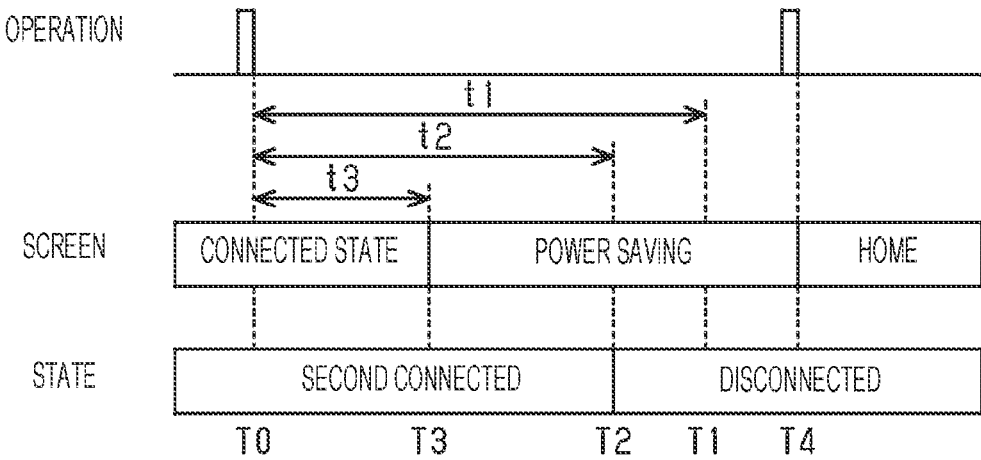
FIG. 15 is a timing chart illustrating details of control.

As illustrated in FIG. 15, at a timing indicated by reference sign T3, the third time period elapses from a timing indicated by reference sign T0 without the operation section 12 being operated or without operation information being operated by the image reading apparatus 11, the controller 20 controls the image reading apparatus 11 to the power saving mode. At the timing indicated by reference sign T3, the image reading apparatus 11 is continuously in the second connected state. At the timing indicated by reference sign T3, the display section 13 displays the power saving screen.

When the third time period is shorter than the first time period and elapses without the operation section 12 being operated in the second connected state, the controller 20 controls the image reading apparatus 11 to the power saving mode. When the third time period is shorter than the second time period and elapses without an operation relating to image reading being performed in the external apparatus 90 in the second connected state, the controller 20 controls the image reading apparatus 11 to the power saving mode.

At a timing indicated by reference sign T2, when the second time period elapses from the timing indicated by reference sign T0 without the operation section 12 being operated or without operation information being received by the image reading apparatus 11, the controller 20 controls the image reading apparatus 11 to the disconnected state. At the timing indicated by reference sign T2, the display section 13 continuously displays the power saving screen.

As described above, when the third time period is shorter than the second time period, and the second time period is shorter than the first time period and elapses without an operation relating to image reading being performed in the external apparatus 90 in the second connected state, the controller 20 controls the image reading apparatus 11 to the disconnected state.

At a timing indicated by reference sign T1, when the first time period elapses from the timing indicated by reference sign T0 without the operation section 12 being operated or without operation information being received by the image reading apparatus 11, the image reading apparatus 11 is continuously in the disconnected state. At the timing indicated by reference sign T1, the display section 13 displays the power saving screen.

Thereafter, at a timing indicated by reference sign T4, when the end condition is established due to an operation of the operation section 12 or the reception of operation information by the image reading apparatus 11, the power saving mode ends. At the timing indicated by reference sign T4, the image reading apparatus 11 is continuously in the disconnected state. At the timing indicated by reference sign T4, the display section 13 displays the home screen 30.

When the end condition is established within a time period between the timing indicated by reference sign T3 and the timing indicated by reference sign T2, the image reading apparatus 11 is continuously in the second connected state before being controlled by the controller 20 to the disconnected state. When the third time period is shorter than the first time period, and the first time period is shorter than the second time period and elapses without the operation section 12 being operated in the second connected state, the controller 20 controls the image reading apparatus 11 to the disconnected state.

Next, a fourth specific example of the operations in the first embodiment is described with reference to FIG. 16. As the fourth specific example, a case where the first time period is shorter than the second time period, the second time period is shorter than the third time period, and the image reading apparatus 11 is in the first connected state is described below.

Figure 16:
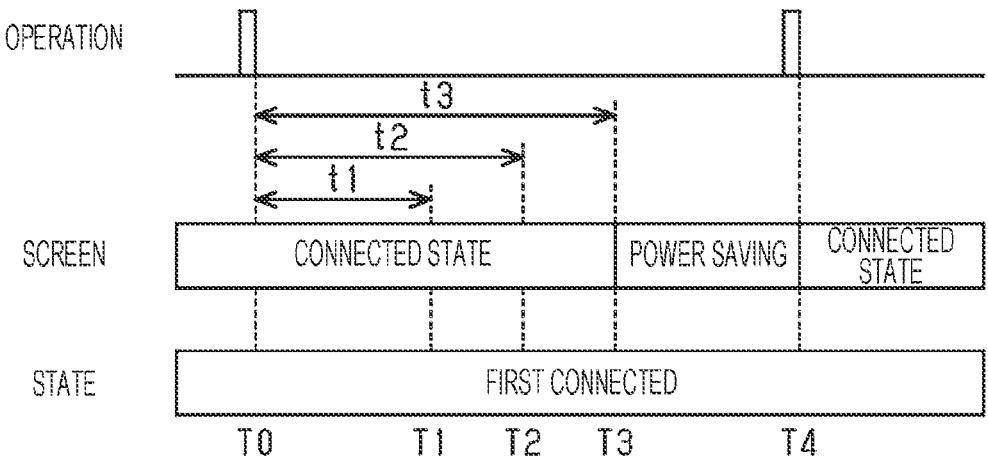
FIG. 16 is a timing chart illustrating details of control.

As illustrated in FIG. 16, at a timing indicated by reference sign T1, when the first time period elapses from a timing indicated by reference sign T0 without the operation section 12 being operated or without operation information being received by the image reading apparatus 11, the image reading apparatus 11 is continuously in the first connected state. At the timing indicated by reference sign T1, the display section 13 continuously displays the connected state screen 32.

As described above, even when the first time period elapses without the operation section 12 being operated in a state in which the connected state screen 32 is displayed by the display section 13 in the first connected state, the image reading apparatus 11 is not controlled to the disconnected state and the home screen 30 is not displayed by the display section 13.

At a timing indicated by reference sign T2, when the second time period elapses from the timing indicated by reference sign T0 without the operation section 12 being operated or without operation information being received by the image reading apparatus 11, the image reading apparatus 11 is continuously in the first connected state. At the timing indicated by reference sign T2, the display section 13 continuously displays the connected state screen 32.

As described above, even when the second time period elapses without an operation relating to image reading being performed in the external apparatus 90 in a state in which the connected state screen 32 is displayed by the display section 13 in the first connected state, the image reading apparatus 11 is not controlled to the disconnected state and the home screen 30 is not displayed by the display section 13.

At a timing indicated by reference sign T3, when the third time period elapses from the timing indicated by reference sign T0 without the operation section 12 being operated or without operation information being received by the image reading apparatus 11, the controller 20 controls the image reading apparatus 11 to the power saving mode. At the timing indicated by reference sign T3, the image reading apparatus 11 is continuously in the first connected state. At the timing indicated by reference sign T3, the display section 13 displays the power saving screen.

As described above, even when the third time period elapses without the operation section 12 being operated in the first connected state, the image reading apparatus 11 is not controlled to the disconnected state. Even when the third time period elapses without an operation relating to image reading being performed in the external apparatus 90 in the first connected state, the image reading apparatus 11 is not controlled to the disconnected state.

Thereafter, at a timing indicated by reference sign T4, when the end condition is established, the power saving mode ends. At the timing indicated by reference sign T4, the image reading apparatus 11 is continuously in the first connected state. At the timing indicated by reference sign T4, the display section 13 displays the connected state screen 32.

Next, a fifth specific example of the operations in the first embodiment is described with reference to FIG. 17. As the fifth specific example, a case where the third time period is shorter than the second time period, the second time period is shorter than the first time period, and the image reading apparatus 11 is in the first connected state is described below.

Figure 17:
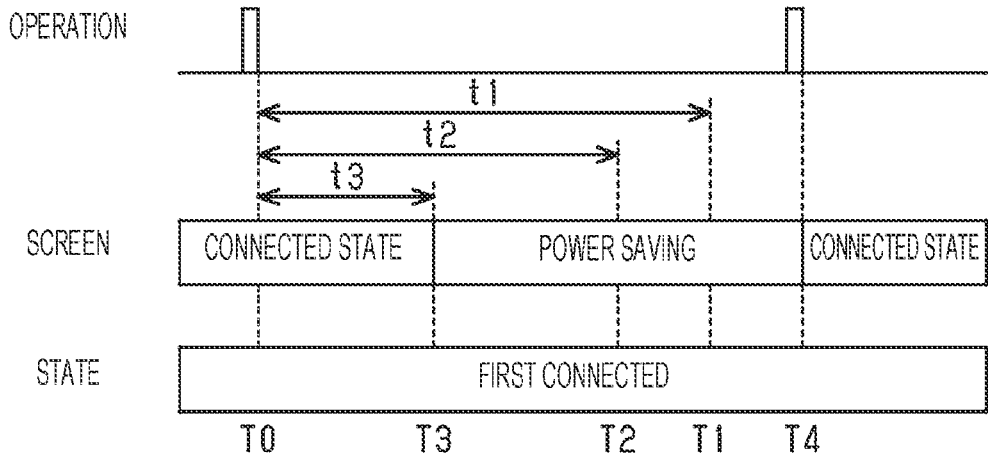
FIG. 17 is a timing chart illustrating details of control.

As illustrated in FIG. 17, at a timing indicated by reference sign T3, when the third time period elapses from a timing indicated by reference sign T0 without the operation section 12 being operated or without operation information being received by the image reading apparatus 11, the controller 20 controls the image reading apparatus 11 to the power saving mode. At the timing indicated by reference sign T3, the image reading apparatus 11 is continuously in the first connected state. At the timing indicated by reference sign T3, the display section 13 displays the power saving screen.

As described above, when the third time period is shorter than the first time period and elapses without the operation section 12 being operated in the first connected state, the controller 20 controls the image reading apparatus 11 to the power saving mode. When the third time period is shorter than the second time period and elapses without an operation relating to image reading being performed in the external apparatus 90 in the first connected state, the controller 20 controls the image reading apparatus 11 to the power saving mode.

At a timing indicated by reference sign T2, when the second time period elapses from the timing indicated by reference sign T0 without the operation section 12 being operated or without operation information being received by the image reading apparatus 11, the image reading apparatus 11 is continuously in the first connected state. At the timing indicated by reference sign T2, the display section 13 continuously displays the power saving screen.

As described above, when the third time period is shorter than the second time period, and the second time period is shorter than the first time period and elapses without an operation relating to image reading being performed in the external apparatus 90 in the first connected state, the image reading apparatus 11 is continuously in the first connected state.

At a timing indicated by reference sign T1, when the first time period elapses from the timing indicated by reference sign T0 without the operation section 12 being operated or without operation information being received by the image reading apparatus 11, the image reading apparatus 11 is continuously in the first connected state. At the timing indicated by reference sign T1, the display section 13 continuously displays the power saving screen.

As described above, even when the third time period is shorter than the second time period, the second time period is shorter than the first time period, and the first time period elapses without the operation section 12 being operated in the first connected state, the image reading apparatus 11 is continuously in the first connected state.

Thereafter, at a timing indicated by reference sign T4, when the end condition is established, the power saving mode ends. At the timing indicated by reference sign T4, the image reading apparatus 11 is continuously in the first connected state. At the timing indicated by reference sign T4, the display section 13 displays the connected state screen 32.

Even when the end condition is established within a time period between the timing indicated by reference sign T3 and the timing indicated by reference sign T2, the image reading apparatus 11 is continuously in the first connected state. When the third time period is shorter than the first time period, and the first time period is shorter than the second time period and elapses without the operation section 12 being operated in the first connected state, the image reading apparatus 11 is continuously in the first connected state.

Next, a sixth specific example of the operations in the first embodiment is described with reference to FIG. 18. As the sixth specific example, a case where the first time period is shorter than the second time period, the second time period is shorter than the third time period, and the image reading apparatus 11 is in the disconnected state is described below.

Figure 18:
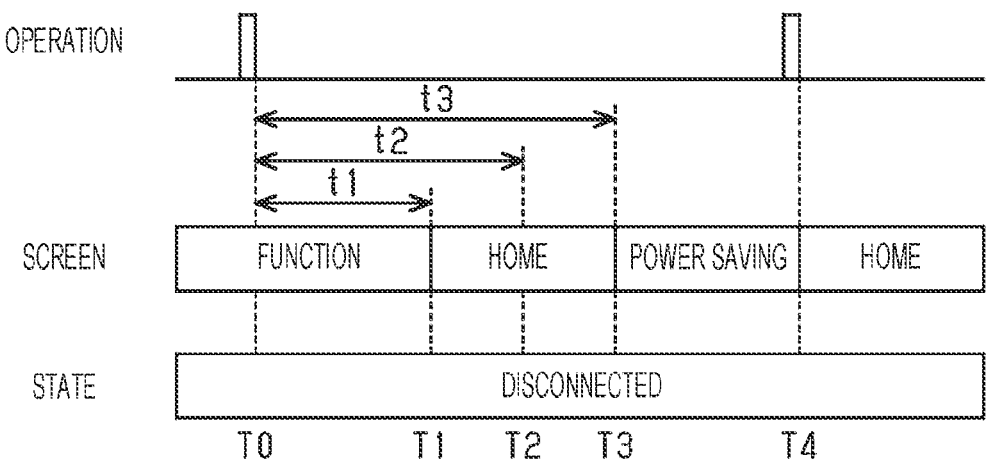
FIG. 18 is a timing chart illustrating details of control.

As illustrated in FIG. 18, at a timing indicated by reference sign T0, when the operation section 12 is operated, the monitoring timer is initialized, and the display section 13 displays the function screen 31.

At a timing indicated by reference sign T1, when the first time period elapses from the timing indicated by reference sign T0 without the operation section 12 being operated, the display section 13 displays the home screen 30. As described above, when the first time period elapses without the operation section 12 being operated in a state in which the function screen 31 is displayed by the display section 13 in the disconnected state, the display section 13 displays the home screen 30.

Next, a seventh specific example of the operations in the first embodiment is described with reference to FIG. 19. As the seventh specific example, a case where the third time period is shorter than the second time period, the second time period is shorter than the first time period, and the image reading apparatus 11 is in the disconnected state is described below.

Figure 19:
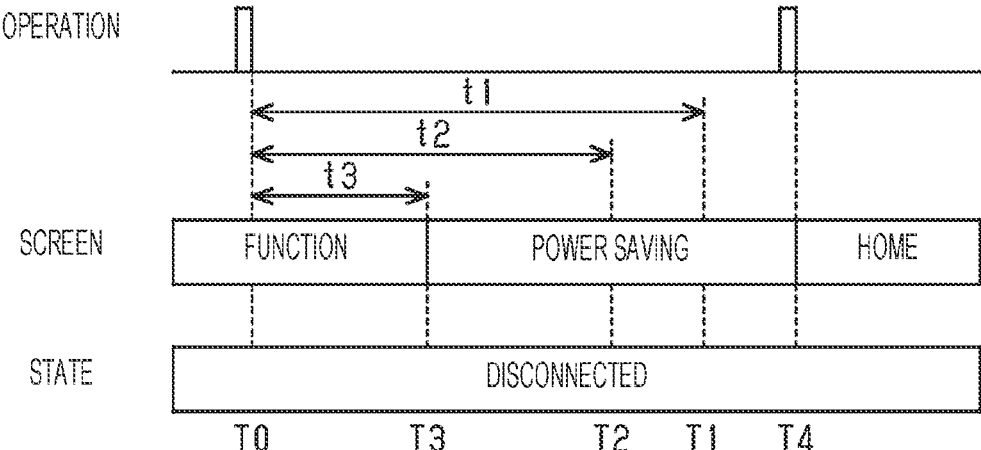
FIG. 19 is a timing chart illustrating details of control.

As illustrated in FIG. 19, at a timing indicated by reference sign T3, the third time period elapses from a timing indicated by reference sign T0 without the operation section 12 being operated, the controller 20 controls the image reading apparatus 11 to the power saving mode. At the timing indicated by reference sign T3, the display section 13 displays the power saving screen. As described above, when the third time period is shorter than the first time period and elapses without the operation section 12 being operated in the disconnected state, the controller 20 controls the image reading apparatus 11 to the power saving mode.

At a timing indicated by reference sign T1, when the first time period elapses from the timing indicated by reference sign T0 without the operation section 12 being operated, the display section 13 continuously displays the power saving screen. As described above, when the third time period is shorter than the first time period, and the first time period elapses without the operation section 12 being operated in the disconnected state, the display section 13 continuously displays the power saving screen.

Thereafter, at a timing indicated by reference sign T4, when the end condition is established, the power saving mode ends. At the timing indicated by reference sign T4, the display section 13 displays the home screen 30.

Effects of First Embodiment

Effects of the first embodiment are described below.

(1-1) It can be assumed that the second connected state is a state that is based on the second connection method by which the image reading apparatus 11 is connectable to external apparatuses 90 in a one-to-many relationship, and in which the plurality of external apparatuses 90 can share the image reading apparatus 11. When the first time period elapses without the operation section 12 being operated in the second connected state, the image reading apparatus 11 can be disconnected from the external apparatuses 90. Thus, when the image reading apparatus 11 is connected to the external apparatuses 90 in the second connected state, and the operation section 12 is not operated for the first time period, a time period in which another external apparatus 90 cannot be connected to the image reading apparatus 11 can be reduced by performing the disconnection processing. Therefore, it is possible to improve user convenience.

(1-2) It can be assumed that the first connected state is a state that is based on the first connection method by which the image reading apparatus 11 is connected to the external apparatus 90 in a one-to-one relationship, and in which the single external apparatus 90 exclusively uses the image reading apparatus 11. Even when the first time period elapses without the operation section 12 being operated in the first connected state, the image reading apparatus 11 is not disconnected from the external apparatus 90. Thus, even when the first time period elapses without the operation section 12 being operated in the first connected state, the image reading apparatus 11 can be continuously connected to the external apparatus 90. In addition, the connection of the image reading apparatus 11 to the external apparatus 90 can be appropriately controlled based on whether the image reading apparatus 11 is connected to the external apparatus 90 in the first connected state or in the second connected state. Therefore, it is possible to improve the user convenience.

(1-3) When the second time period elapses without an operation relating to image reading being performed in the external apparatus 90 in the second connected state, the image reading apparatus 11 can be disconnected from the external apparatus 90. Thus, when an operation relating to image reading is not performed in the external apparatus 90 connected to the image reading apparatus 11 in the second connected state for the second time period, a time period in which another external apparatus 90 cannot be connected to the image reading apparatus 11 can be reduced by performing the disconnection processing. Therefore, it is possible to the user convenience.

(1-4) Particularly, when the second time period is equal to or shorter than the first time period and elapses without an operation relating to image reading being performed in the external apparatus 90 in the second connected state, the disconnection processing is performed. Thus, the disconnection processing is enabled to be performed with priority given to an operation relating to image reading not being performed in the external apparatus 90. Therefore, it is possible to improve the user convenience.

(1-5) When the first time period is equal to or shorter than the second time period and elapses without the operation section 12 being operated, the disconnection processing is performed. Thus, the disconnection processing is enabled to be performed with priority given to the operation section 12 not being operated. Therefore, it is possible to improve the user convenience.

(1-6) It is possible to notify the external apparatus 90 that the image reading apparatus 11 was disconnected from the external apparatus 90. Thus, the external apparatus 90 can identify that the image reading apparatus 11 was disconnected from the external apparatus 90. Therefore, it is possible to improve the user convenience.

(1-7) When the third time period that is shorter than the first time period elapses without the operation section 12 being operated in the second connected state, the controller 20 controls the image reading apparatus 11 to the power saving mode. When the first time period elapses without the operation section 12 being operated in the second connected state, the disconnection processing is performed. Thus, the disconnection processing is performed after the image reading apparatus 11 is controlled to the power saving mode. When the first time period elapses without the operation section 12 being performed in the power saving mode, the disconnection processing is performed. However, when the power saving mode ends before the first time period elapses, the second connected state can be maintained. Therefore, it is possible to save power consumption of the image reading apparatus 11 and improve the user convenience.

(1-8) When the third time period that is shorter than the second time period elapses without an operation relating to image reading being performed in the external apparatus 90 in the second connected state, the controller 20 controls the image reading apparatus 11 to the power saving mode. When the second time period elapses without an operation relating to image reading being performed in the external apparatus 90 in the second connected state, the disconnection processing is performed. Thus, the disconnection processing is performed after the image reading apparatus 11 is controlled to the power saving mode. When the second time period elapses without an operation relating to image reading being performed in the external apparatus 90 in the power saving mode, the disconnection processing is performed. However, when the power saving mode ends before the second time period elapses, the second connected state can be maintained. Therefore, it is possible to save power consumption of the image reading apparatus 11 and improve the user convenience.

(1-9) When the first time period elapses without the operation section 12 being operated in a state in which the connected state screen 32 is displayed by the display section 13 in the second connected state, the display section 13 can display the home screen 30. As a result, when the disconnection processing is performed, the home screen 30 can be displayed. Therefore, it is possible to improve convenience for other users.

(1-10) When the first time period elapses without the operation section 12 being operated in a state in which function screen 31 is displayed by the display section 13, and the display section 13 displays the home screen 30, the display section 13 redisplays the function screen 31 corresponding to a stored input detail according to the specific operation. Thus, even when the home screen 30 is displayed due to the execution of the disconnection processing, the function screen 31 can be redisplayed as intended by the user. In addition, the display section 13 can redisplay the function screen 31 corresponding to a stored input detail. Therefore, it is possible to the user convenience.

(1-11) It is possible to change settings of the first time period, the second time period, and the third time period. Therefore, it is possible to improve the user convenience by changing the settings of the first time period, the second time period, and the third time period.

Second Embodiment

Next, a second embodiment is described. In the second embodiment, a display section 13 may display a confirmation screen due to the occurrence of an idle timeout. In the following description, the same configurations as those described in the first embodiment are denoted by the same reference signs as those described in the first embodiment, and description of the configurations will be omitted or simplified.

Display Screen of Display Section 13

Figure 20:
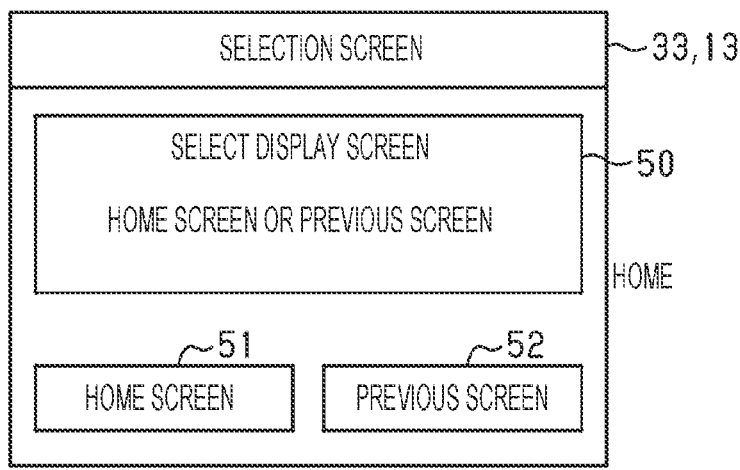
FIG. 20 is a schematic diagram illustrating a display screen in a display section.

As illustrated in FIG. 20, the display section 13 can display the confirmation screen 33. That is, a controller 20 can cause the display section 13 to display the confirmation screen 33. The confirmation screen 33 can be displayed when an idle timeout occurs. The confirmation screen 33 is a screen for confirming a screen to be displayed by the display section 13 after an idle timeout occurs.

As a specific example, a confirmation comment image 50 can be displayed on the confirmation screen 33. The confirmation comment image 50 is an image for prompting to select a display screen to be displayed by the display section 13. On the confirmation screen 33, a home screen button image 51 and a previous screen button image 52 can be displayed. The home screen button image 51 is an image for selecting display of a home screen 30 by the display section 13. The previous screen button image 52 is an image for selecting display of a screen immediately before the occurrence of an idle timeout by the display section 13.

State Monitoring Process

Figure 21:
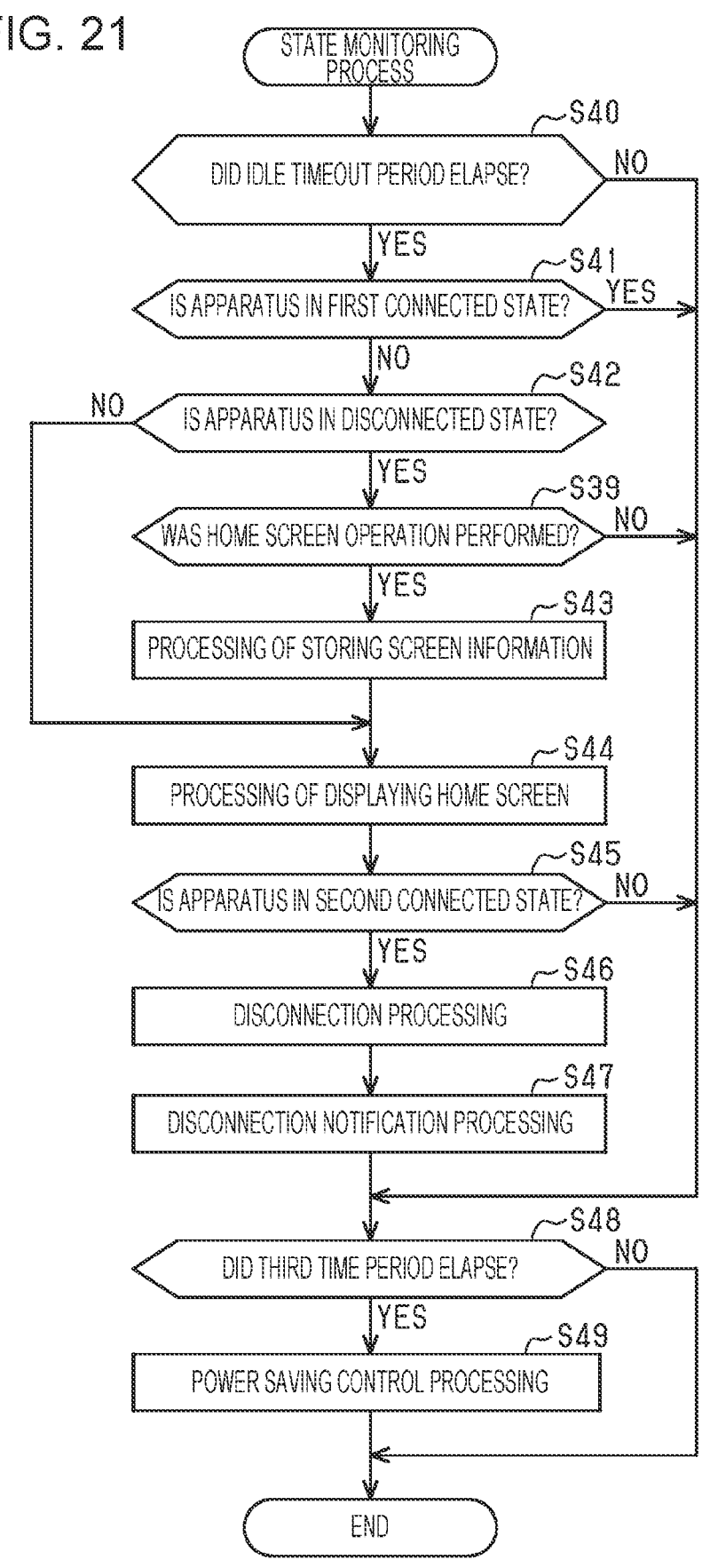
FIG. 21 is a flowchart illustrating a state monitoring process.

As illustrated in FIG. 21, when the controller 20 determines that an image reading apparatus 11 is in a disconnected state in step S42 of a state monitoring process, the controller 20 advances the process to step S39. In step S39, the controller 20 causes the display section 13 to display the confirmation screen 33. In a state in which the display section 13 displays the confirmation screen 33, the controller 20 determines whether a home screen operation of displaying the home screen 30 was performed or a previous screen operation of displaying a screen immediately before the occurrence of an idle timeout was performed.

When the controller 20 determines that the previous screen operation was performed, the controller 20 advances the process to step S48 without performing steps S43 to S47. In this case, the controller 20 may initialize a monitoring timer. When the controller 20 determines that the home screen operation was performed, the controller 20 advances the process to step S43.

As described above, when an idle timeout occurs, the controller 20 causes the display section 13 to display the confirmation screen 33. As a specific example, when a first time period elapses without an operation section 12 being performed in a state in which the controller 20 causes the display section 13 to display a function screen 31 in the disconnected state, the controller 20 causes the display section 13 to display the confirmation screen 33.

Thereafter, when the home screen operation is performed in a state in which the controller 20 causes the display section 13 to display the confirmation screen 33, the controller 20 causes the display section 13 to display the home screen 30. When the previous screen operation is performed in a state in which the controller 20 causes the display section 13 to display the confirmation screen 33, the controller 20 causes the display section 13 to redisplay a screen corresponding to stored screen information. As a specific example, when the previous screen operation is performed in a state in which the controller 20 causes the display section 13 to display the function screen 31 in the disconnected state immediately before the occurrence of an idle timeout, the controller 20 causes the display section 13 to display the function screen 31 corresponding to a stored input detail.

Effects of Second Embodiment

Effects of the second embodiment are described below. (2-1) When the first time period elapses without the operation section 12 being operated in a state in which the function screen 31 is displayed by the display section 13, the confirmation screen 33 is displayed. It is possible to select whether to display the home screen 30 in response to an operation on the confirmation screen 33 or redisplay the function screen 31 corresponding to a stored input detail. Thus, it is possible to provide an opportunity for redisplaying the function screen 31 by displaying the confirmation screen 33 before display of the home screen 30. Therefore, it is possible to improve user convenience.

Modifications

The present embodiment can be modified and implemented as follows. The present embodiment and the following modifications can be implemented in combination without any technical inconsistency.

The confirmation screen 33 can be displayed by the display section 13 but is not limited thereto. For example, the confirmation screen 33 may be displayed by the external display section 93. In this case, the controller 20 may transmit information for displaying the confirmation screen 33 to the external apparatus 90.

The home screen operation and the previous screen operation are based on signals from the operation section 12, but are not limited thereto. For example, the home screen operation and the previous screen operation may be based on signals from the external operation section 92. In this case, the controller 20 may receive information from the external apparatus 90 and determine, based on the received information, that the home screen operation or the previous screen operation was performed.

The controller 20 may disable a setting of at least any one of the first, second, and third time periods to be changed. That is, the controller 20 may change a setting of at least any one of the first, second, and third time periods. The controller 20 may change at least the setting of the first time period.

The controller 20 may disable the disconnection processing to be performed in a state in which the display section 13 displays the home screen 30. That is, when the controller 20 determines that the idle timeout period elapsed in step S40, the controller 20 may determine whether the home screen 30 is being displayed by the display section 13. In this case, when the controller 20 determines that the home screen 30 is being displayed by the display section 13, the controller 20 advances the process to step S48 without performing steps S41 to S47. When the controller 20 determines that the home screen 30 is not being displayed by the display section 13, the controller 20 advances the process to step S41. This processing may be performed after the controller 20 determines that the image reading apparatus 11 is not in the first connected state in step S41.

The controller 20 may not store a type of a display screen depending on the type of the screen being displayed by the display section 13. The controller 20 may not store a detail input on a display screen depending on the type of the screen being displayed by the display section 13. The controller 20 may not store a detail input on a display screen regardless of the type of the screen being displayed by the display section 13.

The controller 20 may set a different first time period depending on a type of a screen being displayed by the display section 13. The controller 20 may set a different second time period depending on a type of a screen being displayed by the display section 13. The controller 20 may set a different third time period depending on a type of a screen being displayed by the display section 13.

The controller 20 may cause or may not cause an idle timeout to occur depending on a type of a screen being displayed by the display section 13. Particularly, the controller 20 may not cause an idle timeout to occur for a screen displayed by the display section 13 for a long time period. As a specific example, the controller 20 may not cause an idle timeout to occur for a screen on which manual information is displayed. The controller 20 may not cause an idle timeout to occur for a screen on which various types of information can be set. The controller 20 may not cause an idle timeout to occur for a screen on which a character can be input using a keyboard or the like. The controller 20 may not cause an idle timeout to occur for a screen on which an option such as a transfer destination to which image data is to be transferred can be selected from among many options. The controller 20 may not cause an idle timeout to occur depending on a type of a transfer destination to which image data is to be transferred. The controller 20 may set an idle timeout to be enabled or disabled depending on a type of a screen being displayed by the display section 13.

The controller 20 may set an idle timeout in the second connected state to be enabled or disabled. The controller 20 may set an idle timeout in the disconnected state to be enabled or disabled. The controller 20 may set an idle timeout in the first connected state to be enabled or disabled. That is, when the first time period elapses without the operation section 12 being operated in the first connected state, and the end condition is established, the controller 20 may cause an idle timeout to occur, cause the display section 13 to display the home screen 30, and perform the disconnection processing. In other words, when the first time period elapses without the operation section 12 being operated in the first connected state, and a specific condition is not established, the controller 20 may cause the display section 13 to display the home screen 30 and perform the disconnection processing without causing an idle timeout to occur. The specific condition may be established when the idle timeout is set to be enabled, but is not limited thereto.

The idle timeout control may be control of displaying a second screen different from both of the home screen 30 and a first screen in a state in which the first screen different from the home screen 30 is displayed by the display section 13. For example, the second screen may be a screen specified by the user instead of the home screen 30.

When the first time period elapses without the operation section 12 being operated in a state in which the controller 20 causes the display section 13 to display the connected state screen 32 in the second connected state, the controller 20 may store a detail displayed on the connected state screen 32. When the second time period elapses without an operation relating to image reading being performed in the external apparatus 90 in a state in which the controller 20 causes the display section 13 to display the connected state screen 32 in the second connected state, the controller 20 may store a detail displayed on the connected state screen 32.

When the first time period elapses without the operation section 12 being operated in a state in which the controller 20 causes the display section 13 to display the connected state screen 32 in the second connected state, the controller 20 may cause the display section 13 to display the confirmation screen 33. When the second time period elapses without an operation relating to image reading being performed in the external apparatus 90 in a state in which the controller 20 causes the display section 13 to display the connected state screen 32 in the second connected state, the controller 20 may cause the display section 13 to display the confirmation screen 33.

The controller 20 may set the control to the power saving mode in the first connected state to be enabled or disabled. The controller 20 may set the control to the power saving mode in the second connected state to be enabled or disabled. The controller 20 may set the control to the power saving mode in the disconnected state to be enabled or disabled.

When the controller 20 controls the image reading apparatus 11 to the power saving mode before the occurrence of an idle timeout, the controller 20 may control the image reading apparatus 11 to the disconnected state. As a specific example, when the controller 20 controls the image reading apparatus 11 to the power saving mode before the occurrence of an idle timeout in the second connected state, the controller 20 may control the image reading apparatus 11 to the disconnected state. When the controller 20 controls the image reading apparatus 11 to the power saving mode before the occurrence of an idle timeout in the disconnected state, the controller 20 may control the image reading apparatus 11 to the disconnected state.

The controller 20 may set whether the image reading apparatus 11 is connectable to the external apparatus 90 in the first connected state. The controller 20 may set whether the image reading apparatus 11 is connectable to the external apparatus 90 in the second connected state. The controller 20 may independently set whether the image reading apparatus 11 is connectable to the external apparatus 90 in each of the first connected state and the second connected state, or may exclusively set whether the image reading apparatus 11 is connectable to the external apparatus 90 in each of the first connected state and the second connected state.

When the second time period elapses regardless of whether the first time period elapsed, the controller 20 may enable an idle timeout to occur. Particularly, when the second time period elapses regardless of the first time period elapsed in the second connected state, the controller 20 may enable an idle timeout to occur. That is, when the second time period elapses without an operation relating to image reading being performed in the external apparatus 90 in the second connected state, the controller 20 may enable the disconnection processing to be performed. When the second time period elapses without an operation relating to image reading being performed in the external apparatus 90 in the first connected state, the controller 20 may disable the disconnection processing to be performed.

When the first time period elapses regardless of whether the second time period elapsed, the controller 20 may enable an idle timeout to occur. Particularly, when the first time period elapses regardless of whether the second time period elapsed in the disconnected state, the controller 20 may enable an idle timeout to occur.

The controller 20 may update a timer for determining whether the first time period elapsed and a timer for determining whether the second time period elapsed. Therefore, the controller 20 may independently determine whether the first time period elapsed and whether the second time period elapsed.

The connection methods may be any methods. For example, the first connection method may include a Bluetooth (registered trademark) connection method. The second connection method is not limited to a connection method using a LAN cable and may be a connection method using a coaxial cable or an optical fiber. For example, the second connection method may be an Ethernet (registered trademark) connection method.

Each of the connection methods may be either a wired connection method or a wireless connection method. For example, the second connection method may include a wireless connection method using IEEE 802.11 standard. That is, the second connection method may include a Wi-Fi (registered trademark) connection method. The first connection method may include a Wi-Fi (registered trademark) connection method.

The image reading apparatus 11 may be an apparatus that is connectable to the external apparatus 90 by only any one of the first connection method and the second connection method. Even in this case, it is possible to control the image reading apparatus 11 with only any one of the first connection method and the second connection method by downloading software into the image reading apparatus 11.

The external apparatus 90 may be, for example, a mobile terminal apparatus. That is, the external apparatus 90 may be an apparatus that performs bidirectional communication with the image reading apparatus 11. The external apparatus 90 may be, for example, a USB memory. That is, the external apparatus 90 may be an apparatus that performs unidirectional communication from the image reading apparatus 11.

The material of the original may be paper but is not limited thereto. The material of the original may be a resin film, a resin sheet, fabric, a metal film, or the like.

The image reading apparatus 11 may be a sheet feeding type apparatus but is not limited thereto. The image reading apparatus 11 may be a flat bed type apparatus. The sheet feeding type apparatus is configured to transport the original in a transport direction. The flat bed type apparatus is configured to move a reader with respect to the original set on the flat bed type apparatus.

The image reading apparatus 11 may be a part of a multifunction apparatus including a scanner function, a printing function, and a copying function.

The term "at least any one" used in the present specification means one or more of desirable options. As an example, the term "at least any one" used in the present specification means only one option or two options when the number of options is two. As another example, the term "at least any one" used in the present specification means only one option or a combination of any two or more options when the number of options is three or more.

SUPPLEMENTARY NOTES

The technical idea recognized from the above-described embodiments and modifications, and the operations and effects of the above-described embodiments and modifications are described below.

(A) An image reading apparatus that is connectable to an external apparatus and reads an image from an original includes a controller and an operation section. The controller is configured to control the image reading apparatus to a first connected state in which the image reading apparatus is connected to the external apparatus by a first connection method by which the image reading apparatus is connected to the external apparatus in a one-to-one relationship via a single communication path, and to a second connected state in which the image reading apparatus is connected to the external apparatus by a second connection method by which the image reading apparatus is connectable to a plurality of external apparatuses in a one-to-many relationship via a single communication path. The controller disables disconnection processing of disconnecting the image reading apparatus from the external device to be performed when a first time period elapses without the operation section being operated in the first connected state, and enables the disconnection processing to be performed when the first time period elapses without the operation section being operated in the second connected state.

According to this configuration, it can be assumed that the second connected state is a state that is based on the second connection method by which the image reading apparatus is connectable to external apparatuses in a one-to-many relationship, and in which the plurality of external apparatuses can share the image reading apparatus. When the first time period elapses without the operation section being operated in the second connected state, the image reading apparatus can be disconnected from the external apparatus. Therefore, when the external apparatus is connected to the image reading apparatus in the second connected state and the operation section is not performed for the first time period, a time period in which another external apparatus cannot be connected to the image reading apparatus can be reduced by performing the disconnection processing. Therefore, it is possible to improve user convenience.

In addition, it can be assumed that the first connected state is a state that is based on the first connection method by which the image reading apparatus is connected to the external apparatus in a one-to-one relationship, and in which the single external apparatus exclusively uses the image reading apparatus. Even when the first time period elapses without the operation section being operated in the first connected state, the image reading apparatus is not disconnected from the external apparatus. Therefore, even when the first time period elapses without the operation section being operated in the first connected state, the image reading apparatus can be continuously connected to the external apparatus. In addition, the connection between the image reading apparatus and the external apparatus can be appropriately controlled based on whether the image reading apparatus is connected to the external apparatus in the first connected state or in the second connected state. Therefore, it is possible to improve the user convenience.

(B) An image reading system including an image reading apparatus that is connectable to an external apparatus and reads an image from an original includes a controller. The controller is configured to control the image reading apparatus to a first connected state in which the image reading apparatus is connected to the external apparatus by a first connection method by which the image reading apparatus is connected to the external apparatus in a one-to-one relationship via a single communication path of the image reading apparatus, and to a second connected state in which the image reading apparatus is connected to the external apparatus by a second connection method by which the image reading apparatus is connectable to a plurality of external apparatuses in a one-to-many relationship via a single communication path of the image reading apparatus. The controller disables disconnection processing of disconnecting the image reading apparatus from the external apparatus to be performed when a first time period elapses without the image reading apparatus being operated in the first connected state, and enables the disconnection processing to be performed when the first time period elapses without the image reading apparatus being operated in the second connected state. According to this configuration, it is possible to obtain a similar effect to that obtained in (A).

(C) In the image reading system, the first connection method may include a USB connection method, and the second connection method may include a LAN connection method. According to this configuration, it is possible to obtain a similar effect to that obtained in (A).

(D) In the image reading system, the controller may enable the disconnection processing to be performed when a second time period elapses without an operation relating to image reading being performed in the external apparatus in the second connected state, and the controller may perform the disconnection processing when the second time period is equal to or shorter than the first time period and elapses without an operation relating to image reading being performed in the external apparatus in the second connected state.

According to this configuration, when the second time period elapses without an operation relating to image reading being performed in the external apparatus in the second connected state, the image reading apparatus can be disconnected from the external apparatus. Therefore, when the external apparatus is connected to the image reading apparatus in the second connected state, and an operation relating to image reading is not performed in the external apparatus for the second time period, a time period in which another external apparatus cannot be connected to the image reading apparatus can be reduced by performing the disconnection processing. Therefore, it is possible to improve the user convenience.

Particularly, when the second time period is equal to or shorter than the first time period and elapses without an operation relating to image reading being performed in the external apparatus in the second connected state, the disconnection processing is performed. Therefore, the disconnection processing is enabled to be performed with priority given to an operation relating to image reading not being performed in the external apparatus. Therefore, it is possible to improve the user convenience.

(E) In the image reading system, the controller may enable the disconnection processing to be performed when a second time period elapses without an operation relating to image reading being performed in the external apparatus in the second connected state, and the controller may perform the disconnection processing when the first time period is equal to or shorter than the second time period and elapses without the image reading apparatus being operated in the second connected state.

According to this configuration, when the second time period elapses without an operation relating to image reading being performed in the external apparatus in the second connected state, the image reading apparatus can be disconnected from the external apparatus. Therefore, when the external apparatus is connected to the image reading apparatus in the second connected state, and an operation relating to image reading is not performed in the external apparatus for the second time period, a time period in which another external apparatus cannot be connected to the image reading apparatus can be reduced by performing the disconnection processing. Therefore, it is possible to improve the user convenience.

Particularly, when the first time period is equal to or shorter than the second time period and elapses without the image reading apparatus being operated, the disconnection processing is performed. Therefore, the disconnection processing is enabled to be performed with priority given to the image reading apparatus not being operated. Therefore, it is possible to improve the user convenience.

(F) In the image reading system, when the controller performs the disconnection processing, the controller may notify the external apparatus that the image reading apparatus was disconnected from the external apparatus without notifying the image reading apparatus that the image reading apparatus was disconnected from the external apparatus.

According to this configuration, it is possible to notify the external apparatus that the image reading apparatus was disconnected from the external apparatus. Therefore, in the external apparatus, it is possible to identify that the image reading apparatus was disconnected from the external apparatus. Therefore, it is possible to improve the user convenience.

(G) In the image reading system, the controller may be configured to control the image reading apparatus to a power saving mode when a third time period elapses without the image reading apparatus being operated, and the controller may control the image reading apparatus to the power saving mode when the third time period is shorter than the first time period and elapses without the image reading apparatus being operated in the second connected state, and may perform the disconnection processing when the first time period elapses without the image reading apparatus being operated.

According to this configuration, when the third time period that is shorter than the first time period elapses without the image reading apparatus being operated in the second connected state, the image reading apparatus is controlled to the power saving mode. When the first time period elapses without the image reading apparatus being operated in the second connected state, the disconnection processing is performed. Thus, the disconnection processing is performed after the image reading apparatus is controlled to the power saving mode. Therefore, it is possible to save power consumption of the image reading apparatus and improve the user convenience.

(H) In the image reading system, the controller may enable the disconnection processing to be performed when a second time period elapses without an operation relating to image reading being performed in the external apparatus in the second connected state, the controller may be configured to control the image reading apparatus to a power saving mode when a third time period elapses without the image reading apparatus being operated, and the controller may control the image reading apparatus to the power saving mode when the third time period is shorter than the second time period and elapses without the image reading apparatus being operated in the second connected state, and perform the disconnection processing when the second time period elapses without an operation relating to image reading being performed in the external apparatus.

According to this configuration, when the third time period that is shorter than the second time period elapses without an operation relating to image reading being performed in the external apparatus in the second connected state, the image reading apparatus is controlled to the power saving mode. When the second time period elapses without an operation relating to image reading being performed in the external apparatus in the second connected state, the disconnection processing is performed. Thus, the disconnection processing is performed after the image reading apparatus is controlled to the power saving mode. Therefore, it is possible to save power consumption of the image reading apparatus and improve the user convenience.

(I) In the image reading system, the controller may be configured to cause a display section to display a home screen on which a function is specifiable, cause the display section to display a connected state screen indicating a connected state in which the image reading apparatus is connected to the external apparatus, and cause the display section to display the home screen when the first time period elapses without the image reading apparatus being operated in a state in which the controller causes the display section to display the connected state screen in the second connected state.

According to this configuration, when the first time period elapses without the image reading apparatus being operated in a state in which the controller causes the display section to display the connected state screen in the second connected state, the controller can cause the display section to display the home screen. Thus, the home screen can be displayed when the disconnection processing is performed. Therefore, it is possible to improve the user convenience.

(J) In the image reading system, the controller may be configured to cause a display section to display a home screen on which a function is specifiable, and cause the display section to display a function screen according to specifying from the home screen, the controller may store a detail input on the function screen when the first time period elapses without the image reading apparatus being operated in a state in which the controller causes the display section to display the function screen, the controller may be configured to cause the display section to display the home screen when the first time period elapses without the image reading apparatus being operated in a state in which the controller causes the display section to display the function screen, and the controller may cause the display section to redisplay the function screen corresponding to the stored input detail according to a specific operation after the first time period elapses without the image reading apparatus being operated and the controller causes the display section to display the home screen.

According to this configuration, even when the first time period elapses without the image reading apparatus being operated in a state in which the controller causes the display section to display the function screen, and the display section displays the home screen, the controller causes the display section to redisplay the function screen corresponding to the stored input detail according to the specific operation. Thus, even when the home screen is displayed due to the execution of the disconnection processing, it is possible to redisplay the function screen as intended by the user. In addition, it is possible to redisplay the function screen corresponding to the stored input detail. Therefore, it is possible to improve the user convenience.

(K) In the image reading system, the controller may be configured to cause a display section to display a home screen on which a function is specifiable, and cause the display section to display a function screen according to specifying from the home screen, the controller may store a detail input on the function screen when the first time period elapses without the image reading apparatus being operated in a state in which the controller causes the display section to display the function screen, the controller may cause the display section to display a confirmation screen for confirming a screen to be displayed by the display section when the first time period elapses without the image reading apparatus being operated in a state in which the controller causes the display section to display the function screen, the controller may cause the display section to display the home screen when an operation of displaying the home screen is performed in a state in which the controller causes the display section to display the confirmation screen, and the controller may cause the display section to redisplay the function screen corresponding to the stored input detail when an operation of displaying the function screen is performed in a state in which the controller causes the display section to display the confirmation screen.

According to this configuration, when the first time period elapses without the image reading apparatus being operated in a state in which the controller causes the display section to display the function screen, the confirmation screen is displayed. It is possible to select whether to display the home screen by an operation on the confirmation screen or redisplay the function screen corresponding to the stored input detail. Thus, it is possible to provide an opportunity for redisplaying the function screen by displaying the confirmation screen before display of the home screen. Therefore, it is possible to improve the user convenience.

(L) In the image reading system, the controller may change a setting of at least the first time period.

According to this configuration, it is possible to improve the user convenience by changing the setting of the first time period.

(M) In the image reading system, the controller may change a setting of at least any one of the first time period, the second time period, and the third time period.

According to this configuration, it is possible to improve the user convenience by changing a setting of at least any one of the first time period, the second time period, and the third time period.

(N) An image reading control method for an image reading apparatus that is connectable to an external apparatus and reads an image from an original includes disabling disconnection processing of disconnecting the image reading apparatus from the external apparatus to be performed when a first time period elapses without the image reading apparatus being operated in a first connected state in which the image reading apparatus is connected to the external apparatus by a first connection method by which the image reading apparatus is connected to the external apparatus in a one-to-one relationship via a single communication path of the image reading apparatus, and enabling the disconnection processing to be performed when the first time period elapses without the image reading apparatus being operated in a second connected state in which the image reading apparatus is connected to the external apparatus by a second connection method by which the image reading apparatus is connectable to a plurality of external apparatuses in a one-to-many relationship via a single communication path of the image reading apparatus. According to this configuration, it is possible to obtain a similar effect to that obtained in (A).

(O) The image reading control method may include transmitting, from the external apparatus to the image reading apparatus at a predetermined time interval, operation information that identifies an operation relating to image reading when the operation relating to image reading is performed in the external apparatus in the second connected state, and performing the disconnection processing when a second time period that is equal to or shorter than the first time period elapses without the operation information being received by the image reading apparatus in the second connected state. According to this configuration, it is possible to obtain a similar effect to that obtained in (D).

What is claimed is:

1. An image reading apparatus that is connectable to an external apparatus and reads an image from an original, the image reading apparatus comprising:

a controller; and an operation section, wherein the controller is configured to control the image reading apparatus to a first connected state in which the image reading apparatus is connected to the external apparatus by a first connection method by which the image reading apparatus is connected to the external apparatus in a one-to-one relationship via a single communication path, and to a second connected state in which the image reading apparatus is connected to the external apparatus by a second connection method by which the image reading apparatus is connectable to a plurality of external apparatuses in a one-to-many relationship via a single communication path, and the controller disables disconnection processing of disconnecting the image reading apparatus from the external device to be performed when a first time period elapses without the operation section being operated in the first connected state, and enables the disconnection processing to be performed when the first time period elapses without the operation section being operated in the second connected state.

2. An image reading system including an image reading apparatus that is connectable to an external apparatus and reads an image from an original, the image reading system comprising a controller, wherein the controller is configured to control the image reading apparatus to a first connected state in which the image reading apparatus is connected to the external apparatus by a first connection method by which the image reading apparatus is connected to the external apparatus in a one-to-one relationship via a single communication path of the image reading apparatus, and to a second connected state in which the image reading apparatus is connected to the external apparatus by a second connection method by which the image reading apparatus is connectable to a plurality of external apparatuses in a one-to-many relationship via a single communication path of the image reading apparatus, and the controller disables disconnection processing of disconnecting the image reading apparatus from the external apparatus to be performed when a first time period elapses without the image reading apparatus being operated in the first connected state, and enables the disconnection processing to be performed when the first time period elapses without the image reading apparatus being operated in the second connected state.

3. The image reading system according to claim 2, wherein the first connection method includes a USB connection method, and the second connection method includes a LAN connection method.

4. The image reading system according to claim 2, wherein the controller enables the disconnection processing to be performed when a second time period elapses without an operation relating to image reading being performed in the external apparatus in the second connected state, and the controller performs the disconnection processing when the second time period is equal to or shorter than the first time period and elapses without an operation relating to image reading being performed in the external apparatus in the second connected state.

5. The image reading system according to claim 2, wherein the controller enables the disconnection processing to be performed when a second time period elapses without an operation relating to image reading being performed in the external apparatus in the second connected state, and the controller performs the disconnection processing when the first time period is equal to or shorter than the second time period and elapses without the image reading apparatus being operated in the second connected state.

6. The image reading system according to claim 2, wherein when the controller performs the disconnection processing, the controller notifies the external apparatus that the image reading apparatus was disconnected from the external apparatus without notifying the image reading apparatus that the image reading apparatus was disconnected from the external apparatus.

7. The image reading system according to claim 2, wherein the controller is configured to control the image reading apparatus to a power saving mode when a third time period elapses without the image reading apparatus being operated, and the controller controls the image reading apparatus to the power saving mode when the third time period is shorter than the first time period and elapses without the image reading apparatus being operated in the second connected state, and performs the disconnection processing when the first time period elapses without the image reading apparatus being operated.

8. The image reading system according to claim 2, wherein the controller enables the disconnection processing to be performed when a second time period elapses without an operation relating to image reading being performed in the external apparatus in the second connected state, the controller is configured to control the image reading apparatus to a power saving mode when a third time period elapses without the image reading apparatus being operated, and the controller controls the image reading apparatus to the power saving mode when the third time period is shorter than the second time period and elapses without the image reading apparatus being operated in the second connected state, and performs the disconnection processing when the second time period elapses without an operation relating to image reading being performed in the external apparatus.

9. The image reading system according to claim 2, wherein the controller is configured to cause a display section to display a home screen on which a function is specifiable, cause the display section to display a connected state screen indicating a connected state in which the image reading apparatus is connected to the external apparatus, and cause the display section to display the home screen when the first time period elapses without the image reading apparatus being operated in a state in which the controller causes the display section to display the connected state screen in the second connected state.

10. The image reading system according to claim 2, wherein the controller is configured to cause a display section to display a home screen on which a function is specifiable, and cause the display section to display a function screen according to specifying from the home screen, the controller stores a detail input on the function screen when the first time period elapses without the image reading apparatus being operated in a state in which the controller causes the display section to display the function screen, the controller is configured to cause the display section to display the home screen when the first time period elapses without the image reading apparatus being operated in a state in which the controller causes the display section to display the function screen, and the controller causes the display section to redisplay the function screen corresponding to the stored input detail according to a specific operation after the first time period elapses without the image reading apparatus being operated and the controller causes the display section to display the home screen.

11. The image reading system according to claim 2, wherein the controller is configured to cause a display section to display a home screen on which a function is specifiable, and cause the display section to display a function screen according to specifying from the home screen, the controller stores a detail input on the function screen when the first time period elapses without the image reading apparatus being operated in a state in which the controller causes the display section to display the function screen, the controller causes the display section to display a confirmation screen for confirming a screen to be displayed by the display section when the first time period elapses without the image reading apparatus being operated in a state in which the controller causes the display section to display the function screen, the controller causes the display section to display the home screen when an operation of displaying the home screen is performed in a state in which the controller causes the display section to display the confirmation screen, and the controller causes the display section to redisplay the function screen corresponding to the stored input detail when an operation of displaying the function screen is performed in a state in which the controller causes the display section to display the confirmation screen.

12. The image reading system according to claim 2, wherein the controller can change a setting of at least the first time period.

13. The image reading system according to claim 8, wherein the controller can change a setting of at least any one of the first time period, the second time period, and the third time period.

14. An image reading control method for an image reading apparatus that is connectable to an external apparatus and reads an image from an original, the image reading control method comprising:

disabling disconnection processing of disconnecting the image reading apparatus from the external apparatus to be performed when a first time period elapses without the image reading apparatus being operated in a first connected state in which the image reading apparatus is connected to the external apparatus by a first connection method by which the image reading apparatus is connected to the external apparatus in a one-to-one relationship via a single communication path of the image reading apparatus; and enabling the disconnection processing to be performed when the first time period elapses without the image reading apparatus being operated in a second connected state in which the image reading apparatus is connected to the external apparatus by a second connection method by which the image reading apparatus is connectable to a plurality of external apparatuses in a one-to-many relationship via a single communication path of the image reading apparatus.

15. The image reading control method according to claim 14, further comprising:

transmitting, from the external apparatus to the image reading apparatus at a predetermined time interval, operation information that identifies an operation relating to image reading when the operation relating to image reading is performed in the external apparatus in the second connected state; and performing the disconnection processing when a second time period that is equal to or shorter than the first time period elapses without the operation information being received by the image reading apparatus in the second connected state.

\* \* \* \* \*